US011091319B2

(12) United States Patent
Lapointe et al.

(10) Patent No.: US 11,091,319 B2
(45) Date of Patent: Aug. 17, 2021

(54) WASTE MATERIAL COMPACTION APPARATUS AND VEHICLE INCLUDING SAME

(71) Applicant: 9103-8034 QUEBEC, INC, Saint-Casimir (CA)

(72) Inventors: Christian Lapointe, Levis (CA); Maxime Cantin, Donnacona (CA)

(73) Assignee: Scranton Manuactunng Company Inc., Scranton, IA (US)

( * ) Notice: Subject to any disclaimer, the term of this patent is extended or adjusted under 35 U.S.C. 154(b) by 331 days.

(21) Appl. No.: 16/383,510

(22) Filed: Apr. 12, 2019

(65) Prior Publication Data
US 2019/0366669 A1  Dec. 5, 2019

Related U.S. Application Data

(60) Provisional application No. 62/678,516, filed on May 31, 2018.

(51) Int. Cl.
*B65F 3/22* (2006.01)
*B30B 3/02* (2006.01)
*B65G 33/20* (2006.01)
*B65G 33/22* (2006.01)

(52) U.S. Cl.
CPC ............ *B65F 3/22* (2013.01); *B30B 3/02* (2013.01); *B65G 33/20* (2013.01); *B65G 33/22* (2013.01)

(58) Field of Classification Search
CPC . B65F 3/22; B30B 3/02; B30B 9/3046; B30B 9/3064; B65G 33/20; B65G 33/22
See application file for complete search history.

(56) References Cited

U.S. PATENT DOCUMENTS

| 4,101,039 A | 7/1978 | Talenti |
| 4,227,849 A * | 10/1980 | Worthington ........... B65F 3/046 414/408 |
| 4,256,035 A | 3/1981 | Nuefeldt |
| 4,640,659 A * | 2/1987 | Parks .................... B65F 3/22 100/98 R |
| 5,195,429 A | 3/1993 | Firpo |
| 5,611,268 A | 3/1997 | Hamilton |

(Continued)

FOREIGN PATENT DOCUMENTS

| CN | 203048026 U | 7/2013 |
| DE | 9407538 U1 | 7/1994 |

(Continued)

*Primary Examiner* — Gene O Crawford
*Assistant Examiner* — Keith R Campbell
(74) *Attorney, Agent, or Firm* — Sturm & Fix LLC

(57) ABSTRACT

The present disclosure concerns a compaction apparatus having a hopper housing defining a hopper chamber to receive materials; a container storing the materials in a compacted fashion; a screw conveying the materials from the hopper chamber to the container and comprising a screw hopper segment extending in the hopper chamber; a partition assembly located between the hopper and the container; and a containment assembly comprising a flap mounted to the hopper housing and being movable between a loading configuration wherein the flap uncovers the screw hopper segment, and a containment configuration in which the flap at least partially covers the screw hopper segment to contain the materials in the hopper chamber.

26 Claims, 17 Drawing Sheets

(56) References Cited

U.S. PATENT DOCUMENTS

| | | | |
|---|---|---|---|
| 5,988,541 A | 11/1999 | Barone | |
| 2016/0010295 A1 | 1/2016 | Boschung et al. | |
| 2016/0280459 A1* | 9/2016 | Fillion | ................ B30B 11/246 |

FOREIGN PATENT DOCUMENTS

| | | |
|---|---|---|
| DE | 10032459 A1 | 8/2001 |
| GB | 2333489 A | 7/1999 |
| JP | 10192826 A | 7/1998 |
| WO | 2006010789 A1 | 2/2006 |

\* cited by examiner

WASTE MATERIAL COMPACTION APPARATUS AND VEHICLE INCLUDING SAME

PRIOR APPLICATION

The present application claims priority from U.S. provisional patent application No. 62/678,516, filed on May 31, 2018, and entitled "WASTE MATERIAL COMPACTION APPARATUS AND VEHICLE INCLUDING SAME", the disclosure of which being hereby incorporated by reference in its entirety.

TECHNICAL FIELD

The present invention relates to compaction apparatuses for waste material. More particularly, the present invention relates to waste material compaction apparatuses comprising a screw conveyor system extending between a hopper and a container. The compaction apparatuses can also be adapted on a material transportation vehicle or towed by a motorized vehicle.

BACKGROUND

Compaction apparatuses are used to compact bulky waste materials and usually comprise screw conveyors to displace bulky waste materials from one location to another. The compaction apparatuses are usually adapted to convey and compact waste materials whereas the materials to be compacted may have very variable dimensions, which may compromise the working of the compaction apparatus.

There is thus a need for a compaction apparatus that can, by virtue of its design and components, be easily adapted to convey and compact materials—such as waste materials—of variable dimensions.

BRIEF SUMMARY

It is therefore an aim of the present invention to address the above-mentioned issues.

According to a general aspect of the disclosure, there is provided a compaction apparatus comprising a hopper housing defining a hopper chamber to receive materials; a container to store the materials in a compacted fashion; a conveyor screw configured to convey the materials from the hopper chamber to the container and comprising a screw hopper segment extending in the hopper chamber; and a loading assembly comprising a flap mounted to the hopper housing and defining a material-receiving cavity. The flap is movable between a loading configuration wherein the flap uncovers the screw hopper segment to allow the introduction of the materials in the material-receiving cavity of the flap, and an unloading configuration wherein the flap at least partially covers the screw hopper segment.

According to another general aspect of the disclosure, there is provided a compaction apparatus comprising a hopper housing defining a hopper chamber to receive materials; a container to store the materials in a compacted fashion; a conveyor screw configured to convey the materials from the hopper chamber to the container and comprising a screw hopper segment extending in the hopper chamber and having a longitudinal axis; and a containment assembly comprising a flap mounted to the hopper housing and being movable between a loading configuration wherein the flap uncovers the screw hopper segment to allow the introduction of the materials in the hopper chamber, and a containment configuration wherein the flap at least partially covers the screw hopper segment to contain the materials in the hopper chamber.

According to another general aspect of the disclosure, there is provided a compaction apparatus comprising a hopper housing defining a hopper chamber to receive materials; a container to store the materials in a compacted fashion; a conveyor screw configured to convey the materials from the hopper chamber to the container and comprising a circumferential perimeter and a screw hopper segment extending in the hopper chamber; and a partition assembly located between the hopper chamber and the container and having a partition wall delimiting at least partially the hopper chamber and having a hopper-facing surface; a through opening defined in the partition wall and allowing passage of the materials conveyed by the conveyor screw through the partition wall, the through opening providing access to: a main passageway shaped to be in close relation to a portion of the circumferential perimeter of the conveyor screw; and a by-pass passageway extending outwardly beyond the circumferential perimeter of the conveyor screw and offset from the main passageway and defining a by-pass port in the hopper-facing surface; and a choke slidably mounted to the partition wall to vary a surface area of the by-pass port.

According to another general aspect of the disclosure, there is provided a vehicle comprising a chassis; and a compaction apparatus according to the present disclosure mounted to the chassis.

According to an embodiment, there is provided a compaction apparatus having a hopper housing defining a hopper chamber to receive materials; a container storing the materials in a compacted fashion; a screw conveying the materials from the hopper chamber to the container and comprising a screw hopper segment extending in the hopper chamber; and a containment assembly comprising a flap mounted to the hopper housing and being movable between a loading configuration wherein the flap uncovers the screw hopper segment, and a containment configuration in which the flap at least partially surrounds and covers the screw hopper segment to contain the materials in proximity thereof.

According to another embodiment, there is provided a compaction apparatus having a hopper housing defining a hopper chamber to receive materials; a container storing the materials in a compacted fashion; a screw conveying the materials from the hopper chamber to the container; a partition assembly located between the hopper and the container and having a hopper-facing surface delimiting at least partially the hopper chamber, a through opening allowing passage of the materials conveyed by the screw, the through opening defining in the hopper-facing surface a main passageway shaped to be in close relation to a portion of a circumferential perimeter of the screw, and a by-pass passageway extending outwardly beyond the circumferential perimeter of the screw and offset from the main passageway and defining a by-pass port on the hopper-facing surface. The partition assembly further comprises a choke displaceable with respect to the by-pass port to vary a surface area thereof.

DETAILED DESCRIPTION

Figure 1:
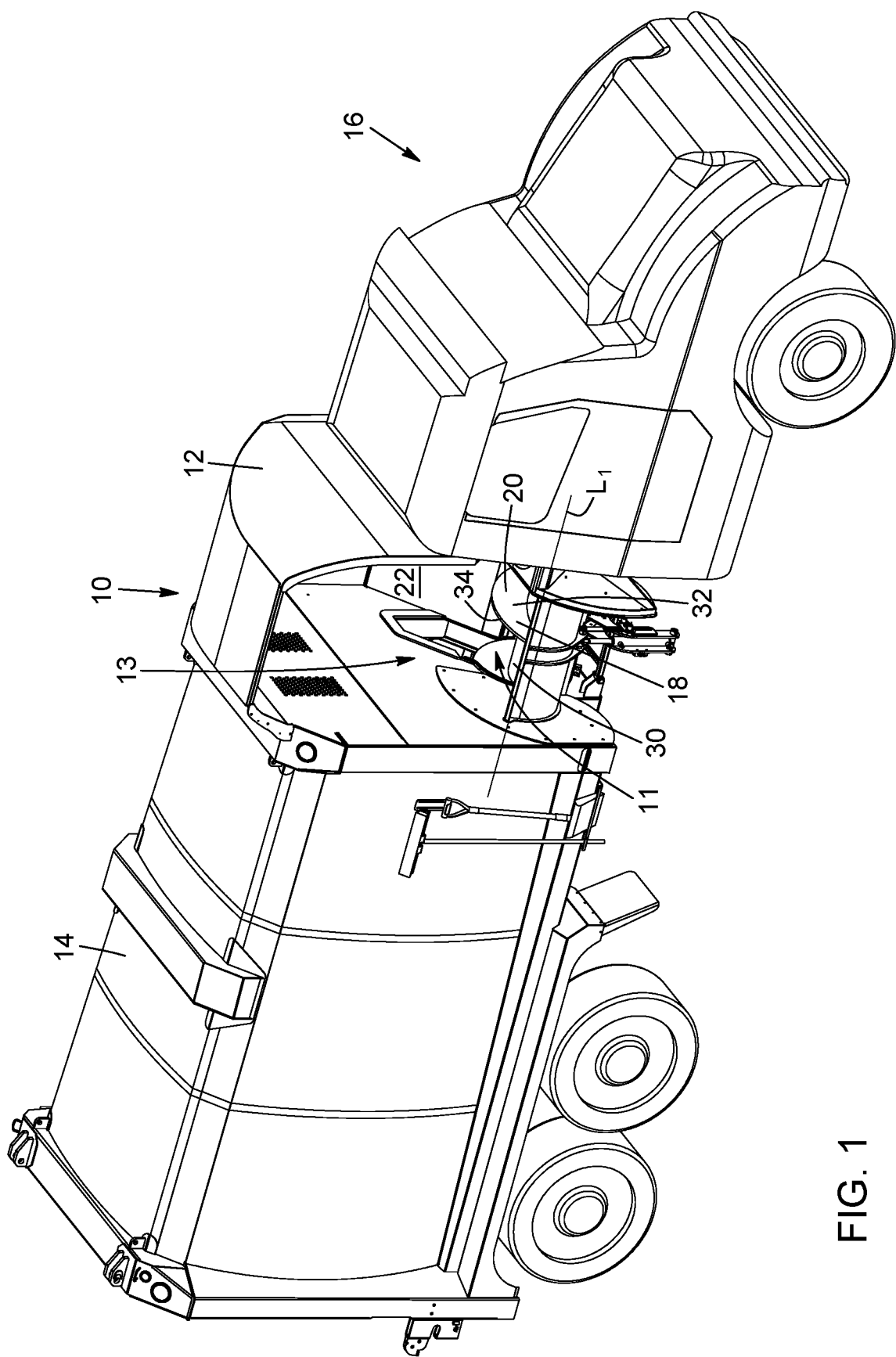
FIG. 1 is a perspective view of a compaction apparatus mounted on a material transportation vehicle.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as "above", "below", "forward", "rearward" "left", "right" and the like should, unless otherwise indicated, be taken in the context of the figures. Positional descriptions should not be considered limiting.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the above description, an embodiment is an example or implementation. The various appearances of "one embodiment," "an embodiment" or "some embodiments" do not necessarily all refer to the same embodiments.

Although various features may be described in the context of a single embodiment, the features may also be provided separately or in any suitable combination. Conversely, although the invention may be described herein in the context of separate embodiments for clarity, it may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only.

The principles and uses of the teachings of the present disclosure may be better understood with reference to the accompanying description, figures and examples.

Furthermore, it is to be understood that the disclosure can be carried out or practiced in various ways and that the disclosure can be implemented in embodiments other than the ones outlined in the description above.

It is to be understood that the terms "including", "comprising", and grammatical variants thereof do not preclude the addition of one or more components, features, steps, or integers or groups thereof and that the terms are to be construed as specifying components, features, steps or integers.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

General Description

Possible embodiments of waste material compaction apparatuses having a screw conveyor system are described in the application WO 2015/074146 filed by the applicant, the specification of which is hereby incorporated by reference.

Referring to FIG. 1, a compaction apparatus 10 for waste materials according to an embodiment is illustrated. The compaction apparatus 10 has a hopper housing 12 defining a hopper chamber 13 to receive materials for compaction.

The compaction apparatus 10 further comprises a container 14 defining a container chamber for storing the materials in a compacted fashion.

In the following description, it should be understood that, unless otherwise stated, the terms outward, outwardly, outer, inward, inwardly or inner are defined with regard to the hopper chamber 13 of the hopper housing 12 and the container chamber of the container 14.

The compaction apparatus 10 is to be understood as a device that promotes the reduction in volume of the processed materials. Compaction is advantageous when the most quantity of materials needs to be contained in a given volume, such as the container 14 or the like. In some implementations, the compaction apparatus 10 may be mounted on a chassis of a material transportation vehicle 16, as shown herein, or it can be towed by a motorized vehicle. In other variants, the compaction apparatus 10 may be provided in a plant or other structure where large size materials need to be stored and disposed. For example, the materials can include waste material, recyclable material or organic waste.

The compaction apparatus 10 further comprises a screw conveyor system 11 including a helical endless screw 18 (or conveyor screw) configured to convey the materials from the hopper chamber 13 to the container 14. Along its length, the screw 18 can be defined into a screw hopper segment 20 extending in the hopper chamber 13 and a container segment (not represented) extending in the container chamber of the container 14. In some implementations, the screw 18 also includes a passageway segment extending in a passageway, as will be described in more details below. It is appreciated that, in some implementations, the screw 18 can be exempt of a container segment. The screw 18 is to be understood as a conveyor screw, therefore designed to convey the material along a path. When the compaction apparatus 100 is mounted to a vehicle comprising a rear end, a front end and first and second sides extending between the rear and front ends, the compaction apparatus 100 can be designed so that the hopper chamber 13 of the compaction apparatus 100 opens in one of the first and second sides.

Referring in particular to FIGS. 2 to 5, 7, 8 and 13, in the embodiment shown, the hopper chamber 13 is dimensioned to receive a certain volume of the materials and is shaped to direct, under the force of gravity, the materials towards the screw 18. It is to be understood that the hopper chamber 13 is not necessarily a funnel-shaped receptacle. The hopper housing 12 may have at least one inclined bottom panel 22 defining an inclination direction I so that materials contained in the hopper chamber 13 are directed towards the screw hopper segment 20 of the screw 18. The hopper housing 12 comprises a lower portion 15 forming a hopper trough 17.

In the embodiment shown, as represented in particular in FIG. 1, the screw hopper segment 20 of the screw 18 comprises a screw shaft 30 defining a longitudinal axis L and a helical screw blade 32 extending around the screw shaft 30 and having a circumferential perimeter 34. In the shown embodiment, the longitudinal axis L extends substantially horizontally. In the following description, the longitudinal axis L will equally relate to the screw hopper segment 20, to the screw 18 or to any other segment of the screw 18 such as the container segment.

The compaction apparatus 10 further comprises a partition assembly 60 located between the hopper housing 12 and the container 14 and having a partition wall 61 with a hopper-facing surface 62 delimiting at least partially the hopper chamber 13. In the embodiment shown, the hopper-facing surface 62 is substantially planar and extends substantially vertically. As represented for instance in FIGS. 7 and 8, the partition wall 61 further comprises an opposed container-facing surface 65, which is, for instance, spaced-apart from the hopper-facing surface 62 and which partially defines the container chamber. In the embodiment shown, the container-facing surface 65 is substantially planar and extends substantially vertically. More particularly, in the embodiment shown, the container-facing surface 65 extends substantially parallel to the hopper-facing surface 62 and define therewith a thickness t of the partition wall 61. It is appreciated that the shape and configuration of the partition wall 61 and of its hopper-facing surface 62 and its container-facing surface 65 can vary from the embodiment shown. For instance, in alternative embodiments (not shown), the hopper-facing surface 62 and/or the container-facing surface 65 could be curved in a convex or concave fashion.

A through opening 64 is further defined in the partition wall 61 of the partition assembly 60. The through opening 64 is shaped and dimensioned to allow passage of the materials conveyed by the screw 18 from the hopper chamber 13 to the container 14. As represented in particular in FIGS. 2, and 4 to 8, the through opening 64 provides access to a main passageway 66 shaped to be in close relation to a portion of the circumferential perimeter 34 of the screw 18, and more particularly to be in close relation to a portion of the circumferential perimeter of a segment of the screw 18 extending through the partition assembly 60. In the embodiment shown, along a majority and even more than 75% of its perimeter, the main passageway 66 is substantially circular in shape and slightly offset outwardly from the circumferential perimeter of the segment of the screw 18 extending through the partition assembly 60. In some embodiments, considered in a plane substantially perpendicular to the longitudinal axis L, a distance comprised between about 1/16" and about 5" is defined between the circumferential perimeter of the segment of the screw 18 extending through the partition assembly 60 and a border of the main passageway 66. In some other embodiments, considered in a plane substantially perpendicular to the longitudinal axis L, the distance between the circumferential perimeter of the segment of the screw 18 extending through the partition assembly 60 and the border of the main passageway 66 is comprised between about 1/8" and about 3". In yet some other embodiments, considered in a plane substantially perpendicular to the longitudinal axis L, the distance between the circumferential perimeter of the segment of the screw 18 extending through the partition assembly 60 and the border of the main passageway 66 is comprised between about 1/4" and about 1".

In the following description, the circumferential perimeter will equally refer to the screw 18, to the screw hopper segment 20, to the helical screw blade 32 of the screw hopper segment 20 or of any other segment of the screw 18. It is appreciated that a diameter of the circumferential perimeter can vary along a length of the screw. It is further understood that the main passageway 66 substantially conforms to the circumferential perimeter of the screw 18 at least along the passageway segment of the screw 18 extending in the main passageway 66 provided by the through opening 64.

Figure 6:
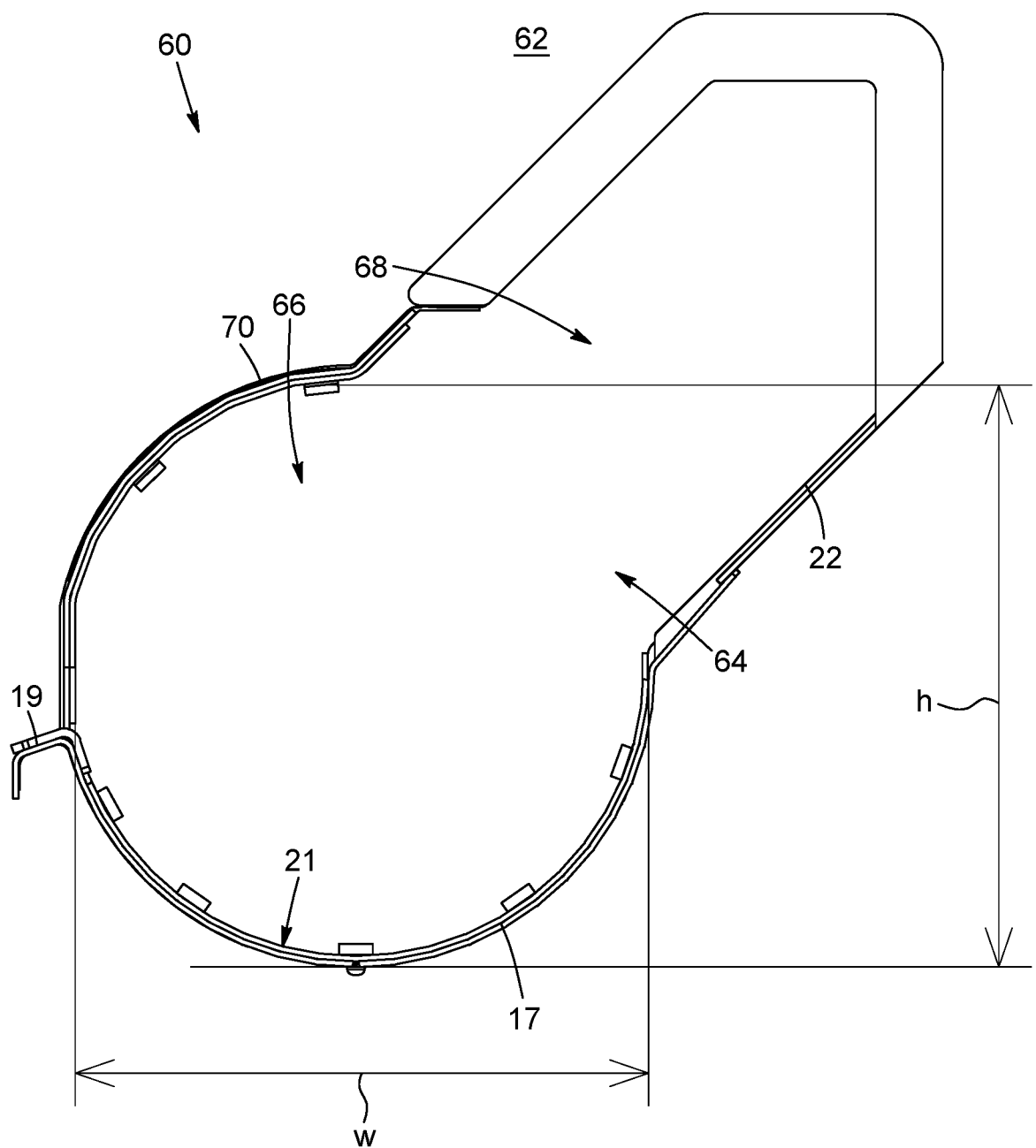
FIG. 6 is an enlarged front elevation view of a through opening formed in a partition wall of a partition assembly according to an embodiment, the through opening providing access to a main passageway and a by-pass passageway, with the conveyor screw being omitted.

The through opening 64 further provides access to a by-pass passageway 68 extending outwardly beyond the outer circumferential perimeter of the screw 18 and offset from the main passageway 66. As represented in FIG. 6, the through opening 64 has an asymmetrical aspect and is in register with the main passageway 66 and the by-pass passageway 68. In other words, the through opening 64, the main passageway 66 and the by-pass passageway 68 are defined by a passageway structure 70 wherein the through opening 64, the main passageway 66 and the by-pass passageway 68 are asymmetrical when viewed cross-sectionally, i.e. substantially normally to the longitudinal axis L of the screw 18.

Figure 7:
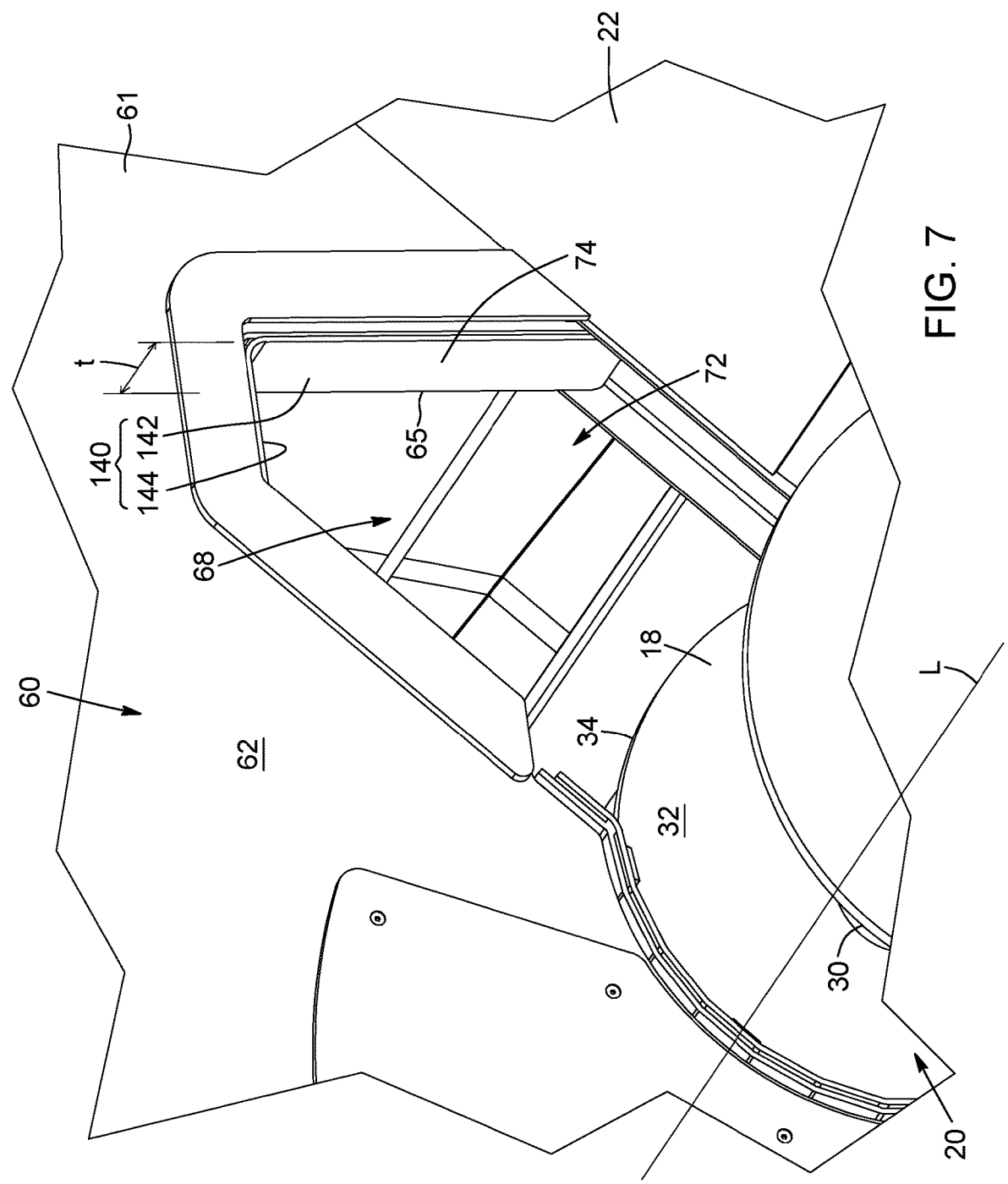
FIG. 7 is a top perspective view of a section of the partition assembly comprising a choke according to an embodiment, the choke being in an open configuration.
Figure 8:
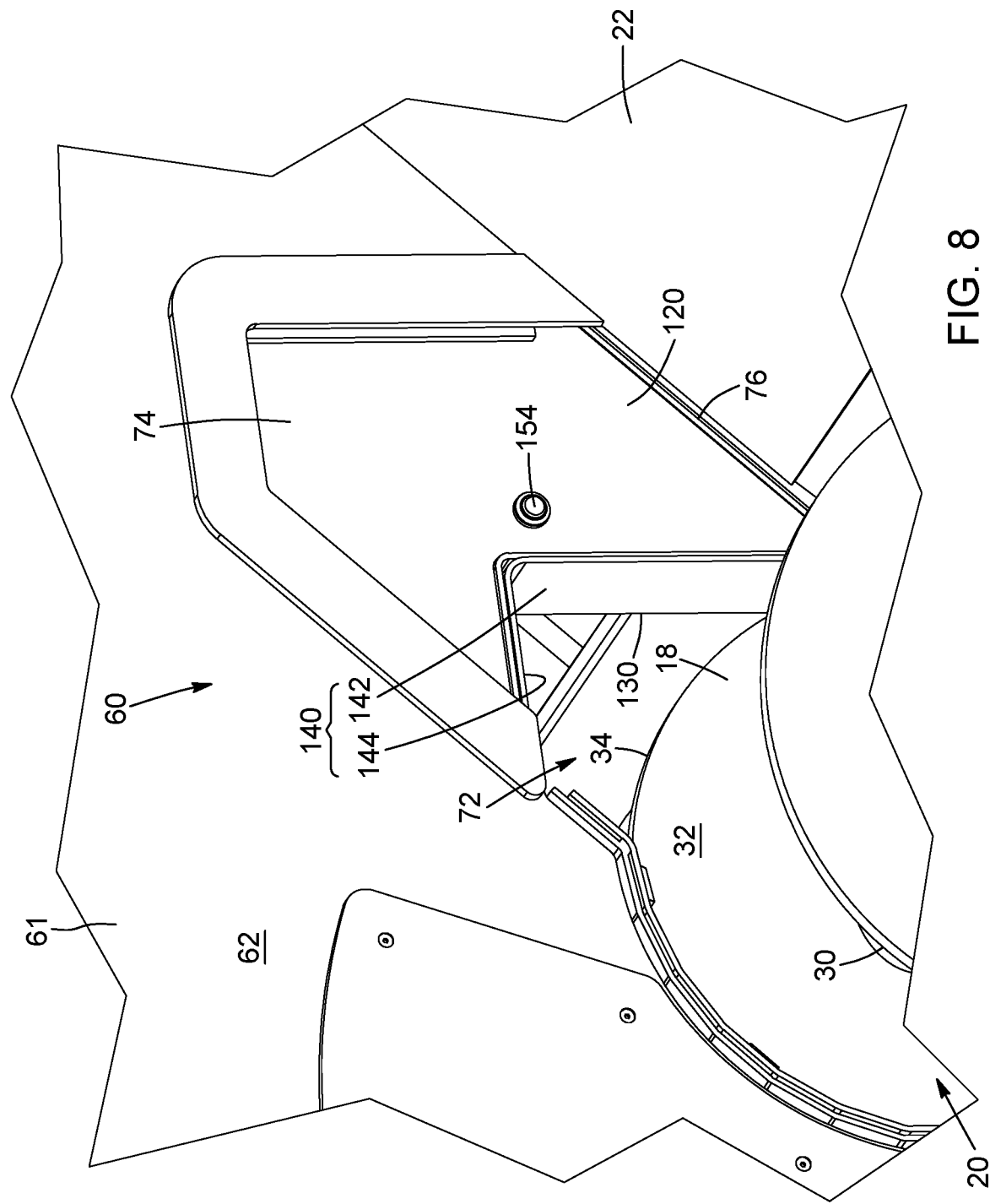
FIG. 8 is a top perspective view of the section of the partition assembly of the embodiment shown in FIG. 7, wherein the choke is in a restricted opening configuration, the surface area of a by-pass port being reduced in comparison with the surface area of the by-pass port when the choke is configured in the open configuration of FIG. 7.

Referring to FIGS. 7 and 8, the main passageway 66 is shaped to be in close relation to the circumferential perimeter 34 of the screw 18 along a section thereof, and more particularly to the circumferential perimeter of the segment of the screw 18 extending through the partition assembly 60. As represented in FIG. 6, the main passageway 66 defines a width w, considered along a substantially horizontal direction, and a height h, considered along a substantially vertical direction. In some implementations, the circumferential perimeter of the main passageway 66 is substantially circular, in which case the width w is substantially similar to the height h, and corresponds to a diameter of a corresponding circle. The main passageway 66 is qualified as main since during operation of the screw 18 since a first type of objects, contained in the processed materials conveyed by the screw 18, passes therethrough in order to be conveyed from the hopper housing 12 to the container 14. Furthermore, this first type of objects can include objects that are compressible and that can be compressed by the action of the screw 18. It is appreciated that the shape and the configuration of the main passageway 66 can vary from the embodiment shown.

As represented in particular in FIGS. 7 and 8, the perimeter of the by-pass passageway 68 may be shaped to extend outwardly beyond the outer circumferential perimeter of the main passageway 66 and offset from the main passageway 66. The by-pass passageway 66 is qualified as by-pass so that a second type of object, i.e. objects that cannot be conveyed or compressed through the main passageway 66, can pass through the by-pass passageway 68. The by-pass passageway 68 defines a by-pass port 72 that provides extra spacing around at least a portion of the circumferential perimeter 34 of the screw 18, providing a passage from the hopper housing 12 to the container 14 to the second type of objects. It is appreciated that the shape and the configuration of the by-pass passageway 68 can vary from the embodiment shown.

The hopper housing 12 further comprises a distal wall 23 extending in the hopper chamber 13 and, in some implementations, at least partially delimitating same. In the shown embodiment, as represented in particular in FIGS. 2 and 3, the distal wall 23 is substantially planar and extends in a plane substantially parallel to the hopper facing surface 62 of the partition assembly 60 and at a distance thereof. It is appreciated that the shape, the configuration and the location of the distal wall 23 can vary from the embodiment shown.

Containment Assembly

Referring now to FIGS. 1 to 5 and 13 to 17, there is shown that the compaction apparatus 10 further comprises a containment assembly 40, 240.

First Embodiment

Figure 2:
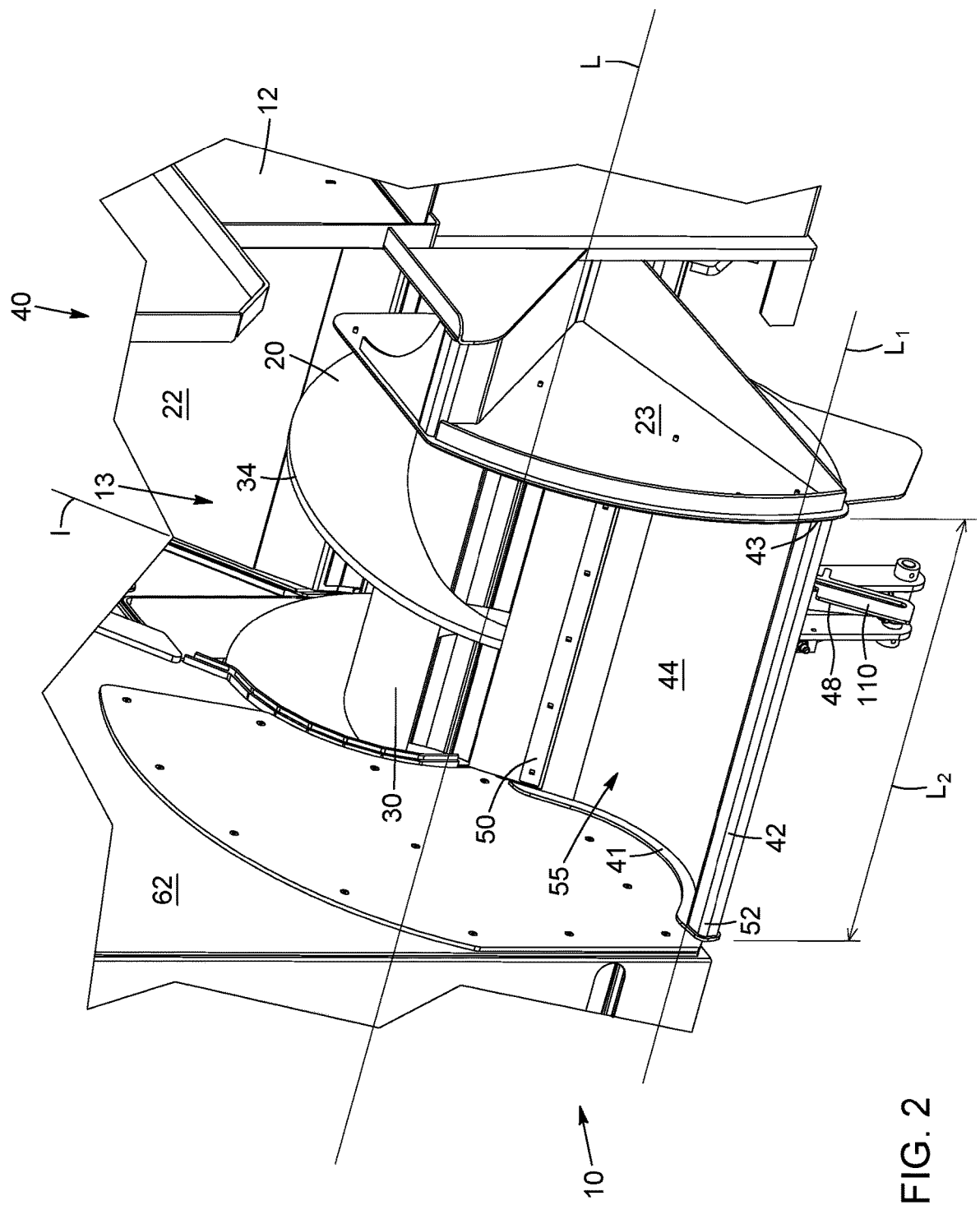
FIG. 2 is a top perspective view of a portion of a compaction apparatus according to an embodiment, a flap of a containment assembly being in a loading configuration.

In the first embodiment shown, as represented in FIGS. 2 to 5 and 13, the containment assembly 40 comprises a flap 42 mounted to the hopper housing 12. The flap 42 comprises a flap longitudinal axis L1—extending substantially horizontally in the shown embodiment, i.e. substantially parallel to the longitudinal axis L of the conveyor screw 18—and first and second opposed longitudinal ends 41, 43. The flap 42 is pivotably mounted to the hopper housing 12 so that the flap 42 is pivotable between the hopper-facing surface 62 of the partition assembly 60 and the distal wall 23 extending in the hopper chamber 13 of the hopper housing 12. In other words, a flap length L2 of the flap 42 (as represented in FIG. 2) corresponds substantially to the distance between the hopper-facing surface 62 of the partition assembly 60 and the distal wall 23 (i.e. to a length of the hopper chamber 13). In yet other words, the flap length L2 of the flap 42 corresponds substantially to a length of the screw hopper segment 20. In the shown embodiment, the flap 42 of the containment assembly 40 is mounted adjacent to an upper edge 19 of the hopper trough 17. The flap 42 comprises a lower portion 50 (or pivotally-mounted portion) and an opposed upper portion 52 (or free portion). In the shown embodiment, the flap 42 is pivotably mounted to the hopper housing 12; more particularly, the lower portion 50 of the flap 42 is pivotably mounted to the upper edge 19 of the hopper trough 17. As represented in particular in FIG. 4, the flap 42 is pivotable about a flap pivoting axis X1 that extends substantially horizontally (i.e. substantially parallel to the longitudinal axis L of the conveyor screw 18). In the shown embodiment, the flap pivoting axis X1 is substantially parallel to the longitudinal axis L of the hopper segment 20 of the screw 18. It is appreciated that the location of the flap 42 relative to the hopper housing 12 can vary from the embodiment shown.

Figure 3:
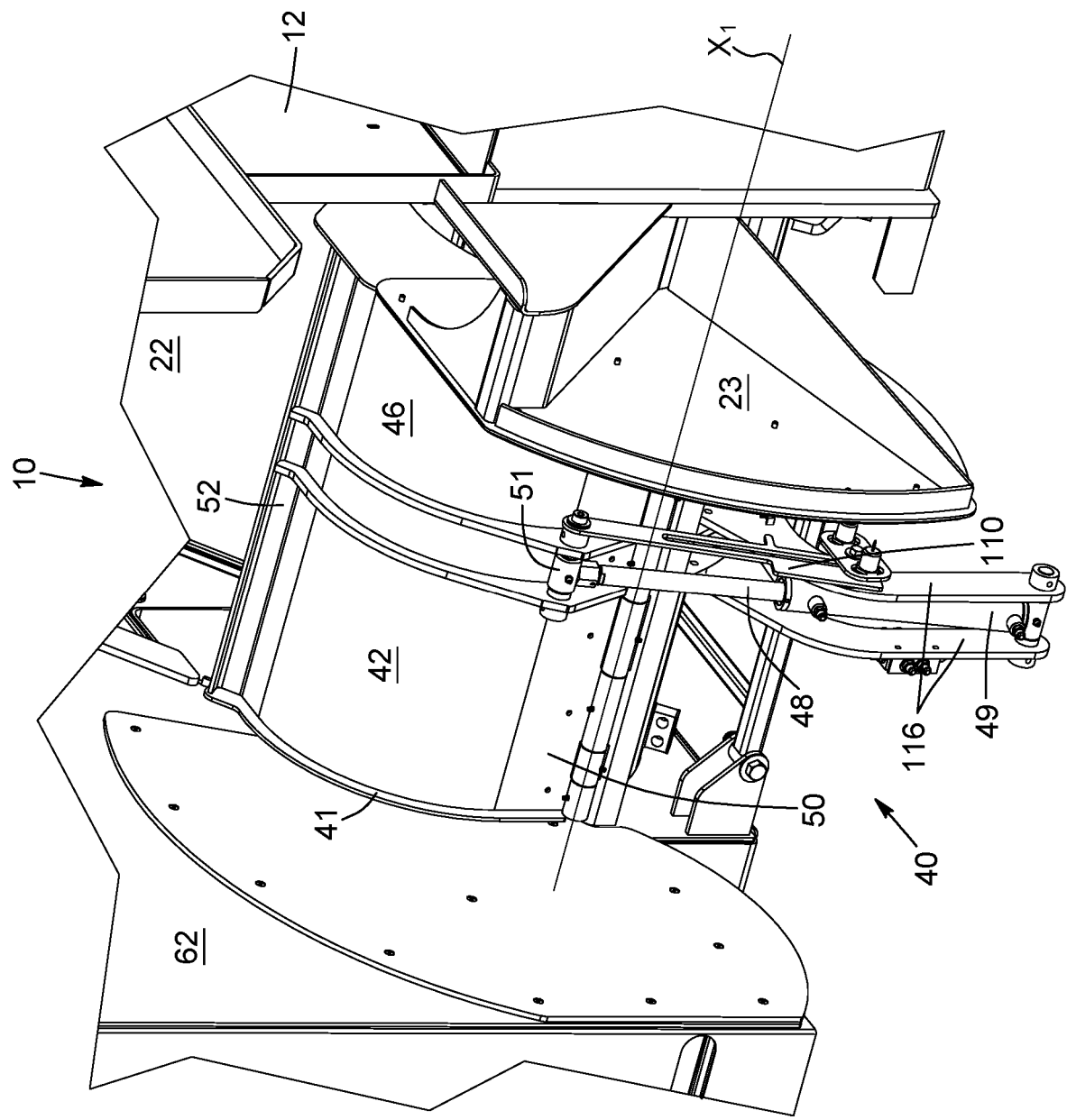
FIG. 3 is a top perspective view of the portion of the compaction apparatus of FIG. 2, the flap of the containment assembly being in a containment configuration.
Figure 4:
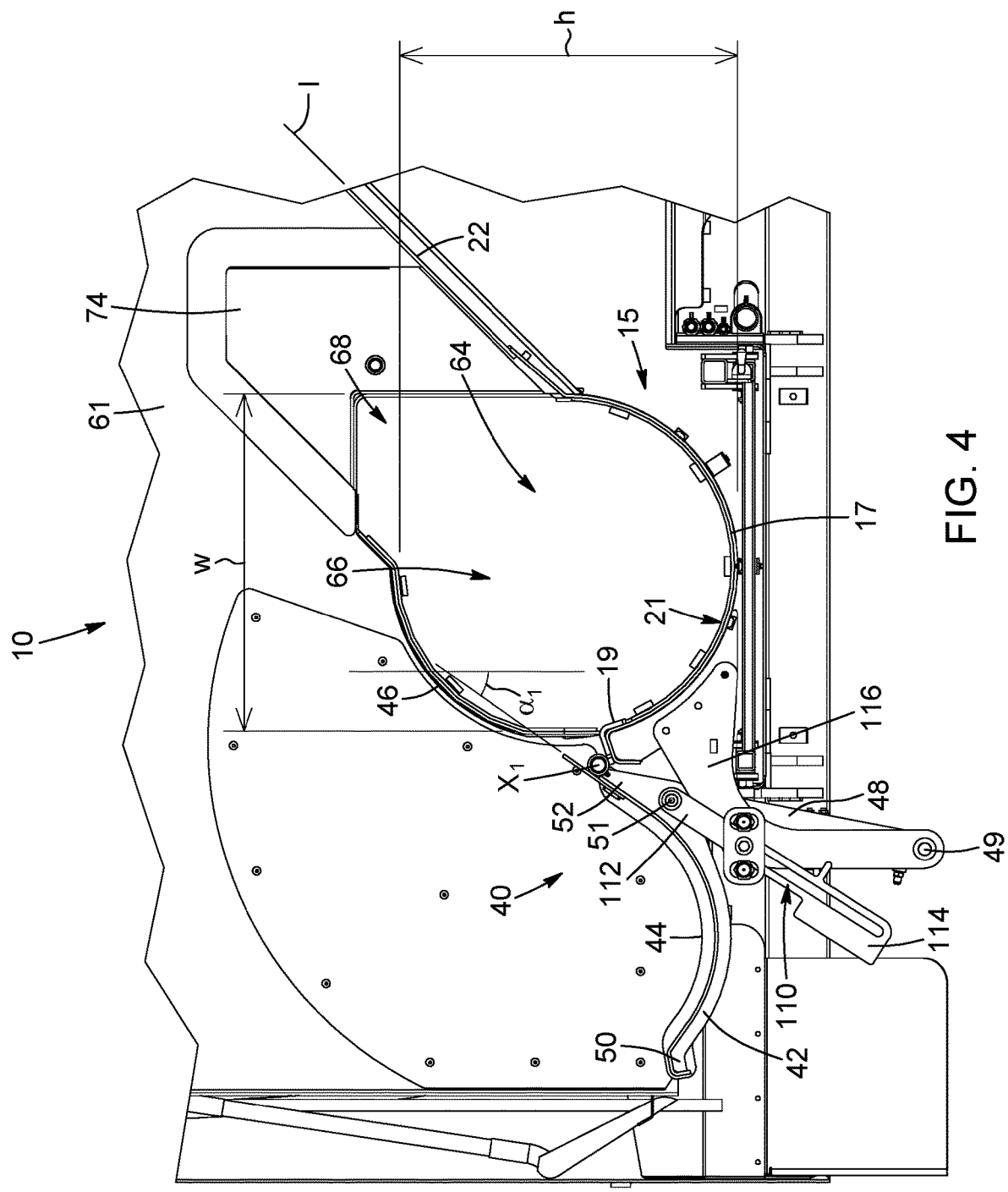
FIG. 4 is a side-elevation view of the compaction apparatus of FIG. 2, with a conveyor screw of a screw conveyor system being omitted.
Figure 5:
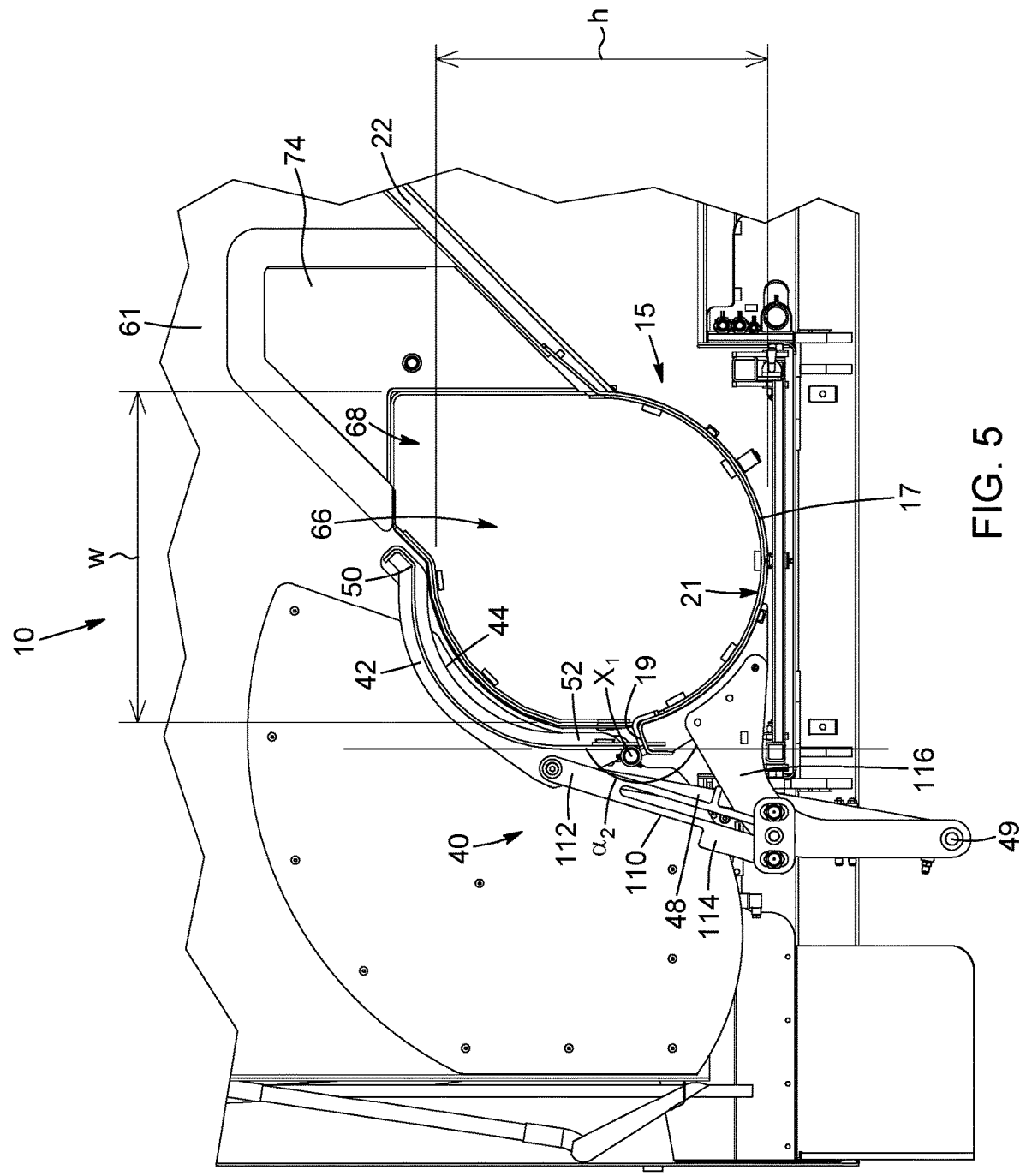
FIG. 5 is a side-elevation view of the compaction apparatus of FIG. 3, with the conveyor screw being omitted.

The flap 42 is movable between a loading configuration, as represented in FIGS. 2 and 4, in which the flap 42 has a first angular position and at least partially uncovers the screw hopper segment 20, and a containment configuration, as represented in FIGS. 3 and 5, in which the flap 42 has a second angular position and at least partially surrounds and covers the screw hopper segment 20 to contain the materials in the hopper chamber 13, and more particularly, in the embodiment shown, in proximity of the screw hopper segment 20. In some embodiments, the first and second angular positions define a displacement angle of the flap 42 comprised between about 10 degrees and about 200 degrees. In some other embodiments, the displacement angle of the flap 42 is comprised between about 20 degrees and about 180 degrees. In some other embodiments, the displacement angle of the flap 42 is comprised between about 40 degrees and about 160 degrees. In some other embodiments, the displacement angle of the flap 42 is comprised between about 60 degrees and about 150 degrees. In yet some other embodiments, the displacement angle of the flap 42 is about 135 degrees. The flap 42 is further configured to take a plurality of intermediate configurations between the loading configuration and the containment configuration, one of these intermediate configurations being represented in FIG. 13.

In the shown embodiment, when in the first angular position (i.e. when the flap 42 is configured in the loading configuration), the angle α1 formed between the lower portion 50 of the flap 42 and a vertical direction considered anti-clockwise as represented in the embodiment of FIG. 4 is comprised between about 10 degrees and about 80 degrees. In some other embodiments, when in the first angular position, the angle α1 formed between the lower portion 50 of the flap 42 and a vertical direction considered anti-clockwise as represented in the embodiment of FIG. 4 is comprised between about 20 degrees and about 60 degrees. In some other embodiments, when in the first angular position, the angle α1 formed between the lower portion 50 of the flap 42 and a vertical direction considered anti-clockwise as represented in the embodiment of FIG. 4 is about 35 degrees.

In the shown embodiment, when in the second angular position (i.e. when the flap 42 is configured in the containment configuration), the angle α2 formed between the lower portion 50 of the flap 42 and a vertical direction considered anti-clockwise as represented in the embodiment of FIG. 5 is comprised between about 120 degrees and about 240 degrees. In some other embodiments, when in the second angular position, the angle α2 formed between the lower portion 50 of the flap 42 and a vertical direction considered anti-clockwise as represented in the embodiment of FIG. 5 is comprised between about 150 degrees and about 210 degrees. In some other embodiments, when in the second angular position, the angle α2 formed between the lower portion 50 of the flap 42 and a vertical direction considered anti-clockwise as represented in the embodiment of FIG. 5 is about 180 degrees.

It is thus understood that the displacement angle of the flap 42 is determined by the difference between the angles α1, α2 formed between the lower portion 50 of the flap 42 and a vertical direction considered anti-clockwise, when the flap 42 is configured in the loading and containment configurations.

The terms "upper" and "lower" relative to the flap 42 should be understood when the flap 42 of the containment assembly 40 is in the containment configuration.

The flap 42 comprises a bottom wall with an inner surface 44 and an opposed outer surface 46. In the shown embodiment, as represented in FIG. 2, the inner surface 44 defines a concavity. As represented in FIG. 4, the flap 42 is designed so that, when in the containment configuration, the inner surface 44 forms a portion of a cylinder with the hopper trough 17. In other words, the hopper trough 17 has an inner surface 21 defining a concavity, the concavities of the hopper trough 17 and of the flap 42 having, for instance in the shown embodiment, a substantially similar curvature. As represented in FIG. 4, in the shown embodiment, when in the containment configuration, the inner surface 44 (and more particularly the concavity of the inner surface 44) substantially conforms to the outer edge of the main passageway 66 formed in the hopper-facing surface 62.

In some embodiments, the concavity of the inner surface 44 of the flap 42 has a curvature comprised between about 2" and about 50". In some other embodiments, the concavity of the inner surface 44 of the flap 42 has a curvature comprised between about 4" and about 40". In yet some other embodiments, the concavity of the inner surface 44 of the flap 42 has a curvature comprised between about 6" and about 24".

Moreover, the flap 42 is shaped and dimensioned so as to extend, when configured in the containment configuration as represented in FIG. 5, along at least about 10% of the width w of the main passageway 66. In some other embodiments, the flap 42 extends along at least about 20% of the width w of the main passageway 66. In some other embodiments, the flap 42 extends along at least about 40% of the width w of the main passageway 66. In some other embodiments, the flap 42 extends along at least about 50% of the width w of the main passageway 66. In some other embodiments, the flap 42 extends along at least about 60% of the width w of the main passageway 66. In yet some other embodiments, the flap 42 extends along at least about 70% of the width w of the main passageway 66.

The flap 42 is further dimensioned and shaped to extend, when configured in the containment configuration as represented in FIG. 5, along at least about 10% of the height h of the main passageway 66. In some other embodiments, the flap 42 extends along at least about 25% of the height h of the main passageway 66. In some other embodiments, the flap 42 extends along at least about 45% of the height h of the main passageway 66. In some other embodiments, the flap 42 extends along at least about 60% of the height h of the main passageway 66. In some other embodiments, the flap 42 extends along at least about 70% of the height h of the main passageway 66. In yet some other embodiments, the flap 42 extends along at least about 80% of the height h of the main passageway 66. It is appreciated that the shape and the configuration of the flap 42 can vary from the embodiment shown.

As represented in particular in FIGS. 2 and 4, the concavity defined by the inner surface 44 of the flap 42 at least partially forms a material-receiving cavity 55. In the embodiment shown, the material-receiving cavity 55 is further partially delimited by the hopper-facing surface 62 of the partition wall 61 and by the distal wall 23.

It is thus understood that, when the flap 40 is configured in the loading configuration, i.e. the flap 40 uncovers the screw hopper segment 20, materials can be introduced in the material-receiving cavity 55 at least partially defined by the flap 40. Moreover, when configured in the containment configuration, the flap 40, i.e. when the flap 40 at least partially covers the screw hopper segment 20, the materials contained in the material-receiving cavity 55 can be poured from the material-receiving cavity 55 into the hopper chamber 13. In other words, the containment configuration could alternatively be defined as an unloading configuration wherein materials received in the material-receiving cavity 55 are poured into the hopper chamber 13. Consistently, the containment assembly 40 could alternatively also be referred to as a loading assembly 40. As explained above, when in the containment configuration, the flap 42 at least partially extends upwardly with regards to the hopper chamber 13 and to the screw hopper segment 20, so that the pouring of the materials from the material-receiving cavity 55 into the hopper chamber 13 (into an upper portion thereof, in the embodiment shown) is eased by gravity. When configured into the containment configuration, the arrangement of the flap 42 with regards to the hopper chamber 13 also limits the risk that materials would be poured outwardly from the hopper chamber 13.

The containment assembly 40 further comprises an actuator 48 (or flap actuator 48) that is configured to cooperate with the flap 42 so as to move the flap 42 from one of the loading and containment (or unloading) configurations to the other. In the shown embodiment, the flap actuator 48 comprises a hydraulic or pneumatic cylinder having a first end 49 mounted indirectly to the hopper housing 12 of the compaction apparatus 10 (in the embodiment shown, indirectly, via a pair of actuator mounting arms 116 extending downwardly from an outer surface of the hopper trough 17), and a second end 51 mounted to the flap 42. In the shown embodiment, the second end 51 is pivotally mounted to the outer surface 46 of the flap 42, between the first and second longitudinal ends 41, 43, substantially centrally thereof. As represented in FIGS. 4 and 5, the containment assembly 40 further comprises a guiding member 110 having a first end 112 secured to the flap 42 (for instance pivotally mounted to the outer surface 46 of the flap 42) and an opposed free end 114 slidably mounted to the hopper housing 12 (for instance, to the actuator mounting arms 116 extending from the hopper trough 17 in the embodiment shown). The guiding member 110 is thus configured to guide the pivoting of the flap 42 upon actuation of the flap actuator 48, between the loading configuration and the containment configuration. It is appreciated that the shape, the configuration, and the location of the flap actuator 48, the actuator mounting arms 116 and the guiding member 110 can vary from the embodiment shown.

It is clear from the different figures that the screw hopper segment 20 is received in the hopper trough 17 of the hopper housing 12, so that the inner surface of the hopper trough 17 substantially conforms to a lower portion of the circumferential perimeter 34 of the helical screw blade 32 of the screw hopper segment 20. The flap 42 is further designed so that its inner surface 44 substantially conforms to an upper portion of the circumferential perimeter of the helical screw blade 32, when the flap 42 is configured in the containment (or unloading) configuration.

It is to be understood that the flap 42, due to its structure and its arrangement relative to the screw hopper segment 20 and the hopper housing 12, is configured to contribute to a partial compaction of the material conveyed by the screw 18 from the hopper chamber 13 to the container 14. Indeed, when the flap 42 is moved from the loading configuration, material to be compacted being loaded into the hopper chamber 13, to the containment configuration, the inner surface 44 of the flap 42 pushes the material towards the screw hopper segment 20 of the screw 18—and more particularly towards the shaft of the screw 18—so as to compact the material and to ease its conveying towards the container 14. As shown in FIG. 4, in the containment configuration, the inner surface 44 of the flap 42 is substantially in close relation with a portion of the main passageway 66.

It is appreciated that the shape, the configuration, and the location of the flap 42 of the containment assembly 40 can vary from the embodiment shown. For instance, whereas in the embodiment shown, the flap 42 is pivotally mounted adjacent to the upper edge 19 of the hopper trough 17 (i.e. pivotally mounted to a lower portion of the hopper housing 12), it could be conceived a flap 42 that would be mounted to the hopper housing 12 at a lower position (i.e. vertically offset with regards to a bottom wall portion of the hopper trough 17) or at a higher position (for instance by being mounted to a wall extension extending upwardly from the upper edge 19 of the hopper trough 17).

The shape and location of the flap 42 could further be modified for the flap 42 to be lowered with regards to the loading configuration represented for instance in FIG. 4 (i.e. the angle α1 formed between the lower portion 50 of the flap 42 and a vertical direction considered anti-clockwise could be further reduced) in order to further ease the introduction of materials in the hopper chamber 13 when the flap 42 is configured in the loading configuration.

The curvature of the concavity defined by the inner surface 44 of the flap 42 could also be modified. For instance, the curvature could be increased to allow a greater volume of materials to be introduced in the hopper chamber 13, or reduced, in order to further increase the compaction of the materials in the hopper chamber 13, when the flap 42 is configured in the containment configuration.

The flap 42 is neither limited to a flap 42 formed of a single component and could comprise a plurality of components, fixedly or not, mounted to each other.

Second Embodiment

In the second embodiment shown in FIGS. 14 to 17, the containment assembly 240 (or loading assembly 240) also comprises a flap 242 mounted to the hopper housing 12 (for instance pivotally mounted adjacent to an upper edge of the hopper trough 17).

The flap 242 also defines a material-receiving cavity 255. In the embodiment shown, the flap 242 comprises a bottom wall 260 (for instance comprising two bottom wall portions 261, 263 inclined relative to each other) comprising an inner surface 262. The inner surface 262 of the bottom wall 260 thus partially defines the inner surface 244 of the flap 242. The flap 242 further comprises first and second lateral wall portions 264, 266 respectively at the first and second longitudinal ends 241, 243 of the flap 242. The first and second lateral wall portions 264, 266 extend transversally (for instance substantially perpendicularly) from the inner surface 262 of the bottom wall 260. In the embodiment shown, the flap 242 further comprises a flap distal wall 268 mounted to the inner surface 262 of the bottom wall 260 and extending between the first and second lateral wall portions 264, 266. For instance, the flap distal wall 268 comprises a plurality of flap distal wall portions (three distal wall portions 270, 272, 274 in the embodiment shown) inclined relative to each other.

In the embodiment shown, the material-receiving cavity 255 is thus at least partially delimited by the bottom wall 260, the first and second lateral wall portions 264, 266 and the flap distal wall 268.

It is appreciated that the shape, the configuration, and the location of the bottom wall 260, the first and second lateral wall portions 264, 266 and the flap distal wall 268 of the flap 242 can vary from the embodiment shown.

Similarly to the first embodiment, the flap 242 in accordance with the second embodiment is selectively configurable into a loading configuration wherein the flap 242 uncovers the screw hopper segment 20 to allow the introduction of the materials in the material-receiving cavity 255 and an unloading configuration wherein the flap 242 at least partially covers the screw hopper segment 20 for the materials to be poured from the material-receiving cavity 255 into the hopper chamber 13. Moreover, when configured in the unloading configuration, the flap 242 is also shaped and designed to contain the materials in the hopper chamber 13, so that that the unloading configuration can also be referred to a containment configuration.

Figure 14:
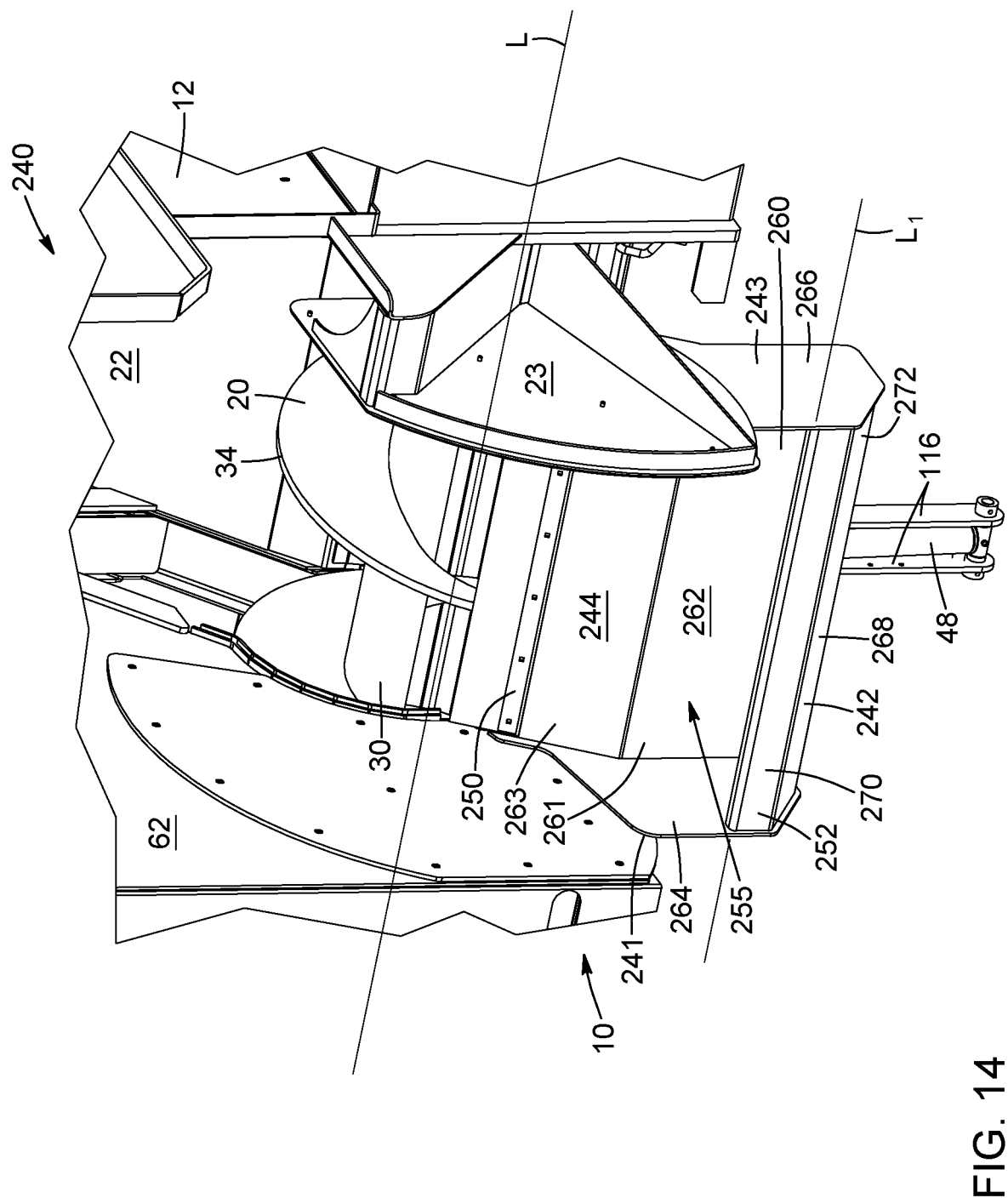
FIG. 14 is a top perspective view of a portion of a compaction apparatus according to another embodiment, wherein a flap of a containment assembly has a different shape and is configured in the loading configuration.
Figure 15:
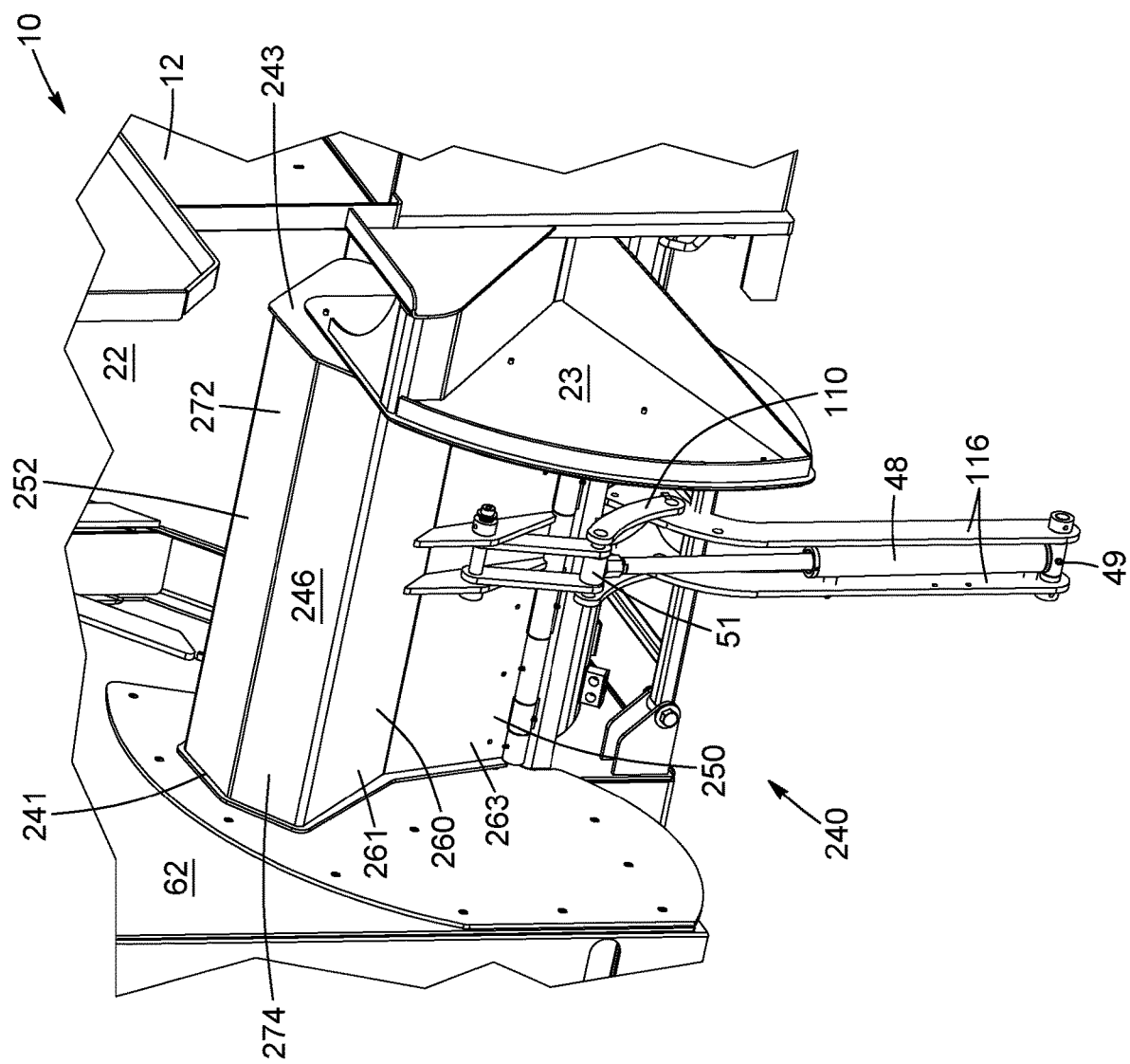
FIG. 15 is a top perspective view of the portion of the compaction apparatus of FIG. 14, the flap of the containment assembly being in an unloading configuration.
Figure 16:
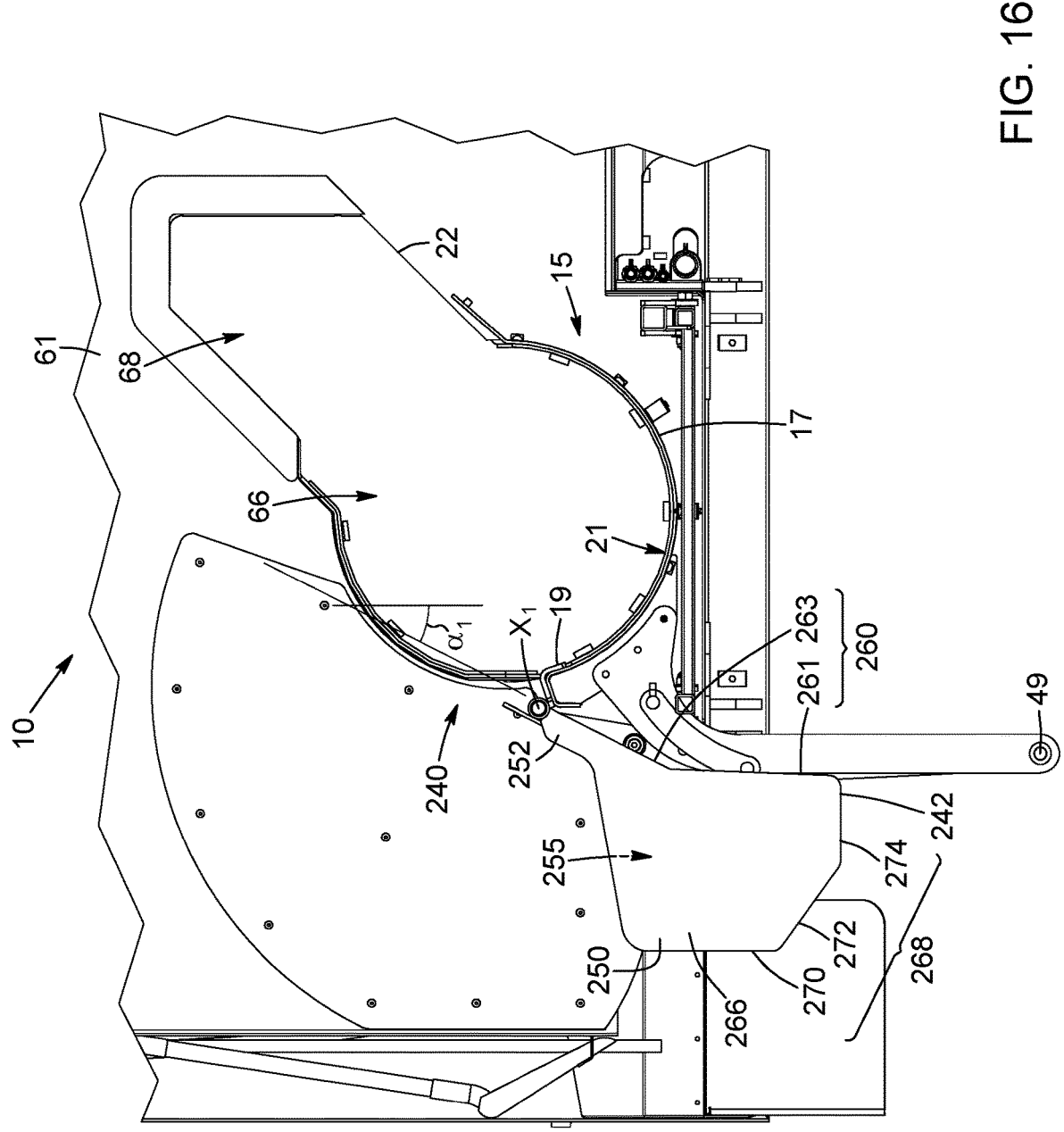
FIG. 16 is a side-elevation view of the portion of the compaction apparatus of FIG. 14, with the conveyor screw of the screw conveyor system being omitted.
Figure 17:
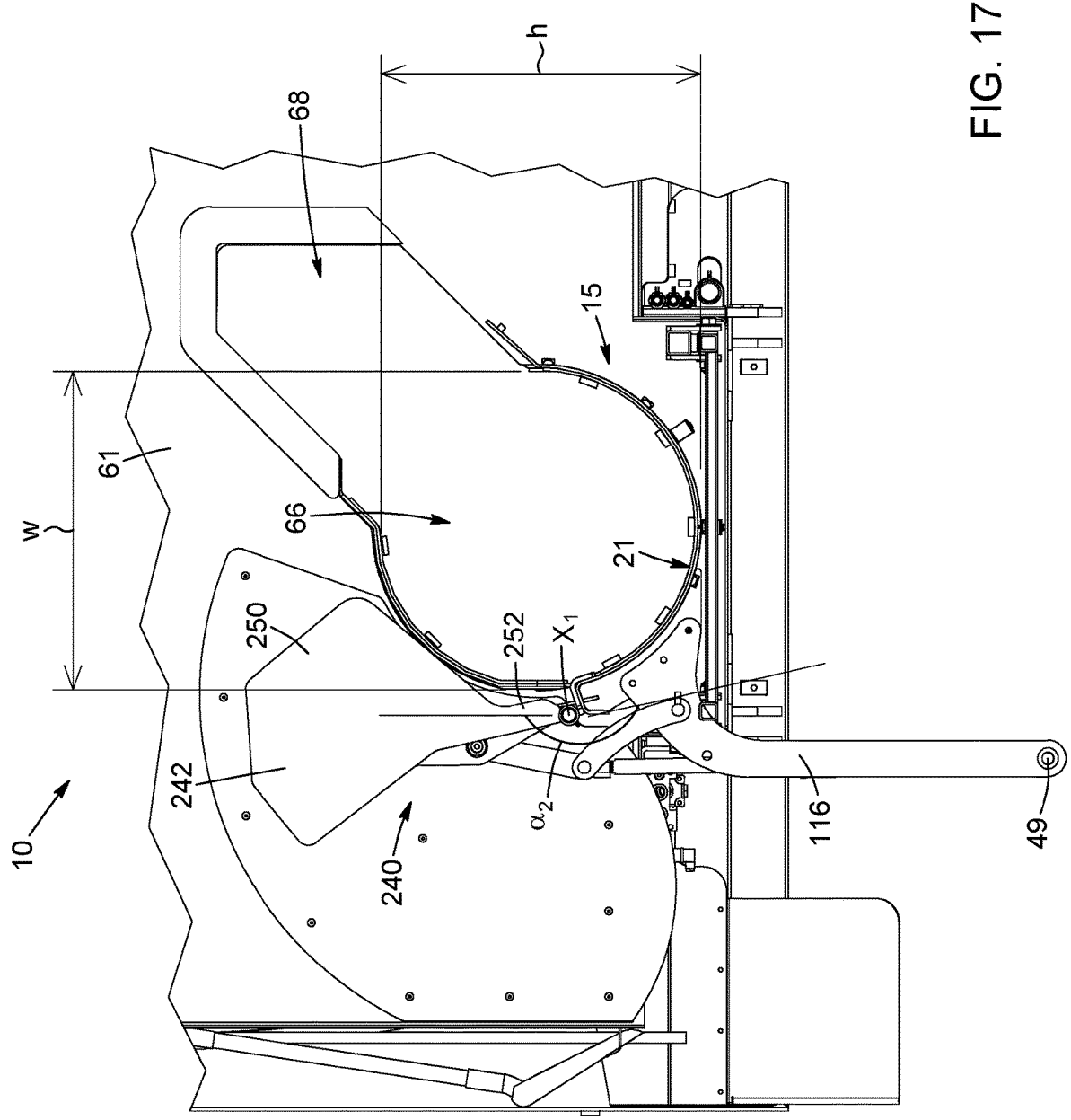
FIG. 17 is a side-elevation view of the portion of the compaction apparatus of FIG. 15, with the conveyor screw being omitted.

Similarly, the flap 242 is movable between the loading configuration, as represented in FIGS. 14 and 16, in which the flap 242 has a first angular position and the containment configuration (or unloading configuration), as represented in FIGS. 15 and 17, in which the flap 242 has a second angular position. In the shown embodiment, the first and second angular positions define a displacement angle of the flap 242 comprised between about 10 degrees and about 200 degrees. In some other embodiments, the displacement angle of the flap 242 is comprised between about 20 degrees and about 180 degrees. In some other embodiments, the displacement angle of the flap 242 is comprised between about 40 degrees and about 160 degrees. In some other embodiments, the displacement angle of the flap 242 is comprised between about 60 degrees and about 150 degrees. In yet some other embodiments, the displacement angle of the flap 242 is about 135 degrees. The flap 242 is further configured to take a plurality of intermediate configurations between the loading configuration and the containment (or unloading) configuration.

In the shown embodiment, when in the first angular position (i.e. when the flap 242 is configured in the loading configuration), the angle α1 formed between the lower portion 250 of the flap 242 and a vertical direction considered anti-clockwise as represented in the embodiment of FIG. 16 is comprised between about 10 degrees and about 80 degrees. In some other embodiments, when in the first angular position, the angle α1 formed between the lower portion 250 of the flap 242 and a vertical direction considered anti-clockwise as represented in the embodiment of FIG. 16 is comprised between about 20 degrees and about 60 degrees. In some other embodiments, when in the first angular position, the angle α1 formed between the lower portion 250 of the flap 242 and a vertical direction considered anti-clockwise as represented in the embodiment of FIG. 16 is about 35 degrees.

In the embodiment shown, when in the second angular position (i.e. when the flap 242 is configured in the containment or unloading configuration), the angle α2 formed between the lower portion 250 of the flap 242 and a vertical direction considered anti-clockwise as represented in the embodiment of FIG. 17 is comprised between about 120 degrees and about 250 degrees. In some other embodiments, when in the second angular position, the angle α2 formed between the lower portion 250 of the flap 242 and a vertical direction considered anti-clockwise as represented in the embodiment of FIG. 17 is comprised between about 150 degrees and about 230 degrees. In some other embodiments, when in the second angular position, the angle α2 formed between the lower portion 250 of the flap 242 and a vertical direction considered anti-clockwise as represented in the embodiment of FIG. 17 is about 190 degrees.

Similarly to the first embodiment, as represented in FIG. 17, the flap 242 is shaped and dimensioned so as to extend, when configured in the containment configuration, along at least about 10% of the width w of the main passageway 66. In some other embodiments, the flap 242 is shaped and dimensioned so as to extend, when configured in the containment configuration, along at least about 25% of the width w of the main passageway 66. In some other embodiments, the flap 242 is shaped and dimensioned so as to extend, when configured in the containment configuration, along at least about 40% of the width w of the main passageway 66. In some other embodiments, the flap 242 is shaped and dimensioned so as to extend, when configured in the containment configuration, along at least about 60% of the width w of the main passageway 66.

The flap 242 is further dimensioned and shaped to extend, when configured in the containment configuration, along at least about 25% of the height h of the main passageway 66. In some other embodiments, the flap 242 is dimensioned and shaped to extend, when configured in the containment configuration, along at least about 40% of the height h of the main passageway 66. In yet some other embodiments, the flap 242 is dimensioned and shaped to extend, when configured in the containment configuration, along at least about 60% of the height h of the main passageway 66.

Moreover, in each of the first and second embodiments, the flap 42, 242 is dimensioned and shaped so that the inner surface 44, 244 of the bottom wall of the flap 42, 242 faces substantially upwardly in the loading configuration and faces substantially downwardly in the unloading—or containment—configuration. Moreover, in both embodiments, the inner surface 44, 244 of the bottom wall of the flap 42, 242 is substantially in register with a section of the perimeter of the main passageway 66 when configured in the unloading—or containment—configuration.

Choke

As represented in particular in FIGS. 7 to 12 the partition assembly 60 further comprises a choke 74 that is mounted—either directly or indirectly—to the partition wall 61. The choke 74 is displaceable with respect to the by-pass port 72 defined by the by-pass passageway 68 to vary a surface area thereof. The choke 74 can be mounted to the container-facing surface 65 of the partition wall 61 of the partition assembly 60, to the hopper-facing surface 62 of the partition wall 61, or, as in the embodiment shown, in the partition wall 61 of the partition assembly 60, i.e. between the container-facing surface 65 and the hopper-facing surface 62 spaced-apart from each other.

As represented in FIGS. 7 to 12, the choke 74 is displaceable between at least an open configuration, as represented in FIG. 7, in which the by-pass port 72 has a first surface area, and a restricted opening configuration, as represented in FIG. 8, in which the by-pass port 72 has a second surface area smaller than the first surface area. The surface area of the by-pass port 72 corresponds to the surface area through which waste material can enter therethrough by being uncovered by the choke 74. It is understood that the choke 74 is configured to take a plurality of intermediate configurations between the open and restricted opening configurations. It is further understood that the choke 74 is configured to guide waste material towards the passageway structure 70 of the partition assembly 60, so as better convey and compact the waste material.

In some embodiments, the second surface area represents less than about 90% of the first surface area. In some other embodiments, the second surface area represents less than about 80% of the first surface area. In some other embodiments, the second surface area represents less than about 70% of the first surface area. In some other embodiments, the second surface area represents less than about 50% of the first surface area. In some other embodiments, the second surface area represents less than about 30% of the first surface area. In some other embodiments, the second surface area represents less than about 20% of the first surface. In yet some other embodiments, the second surface area represents less than about 10% of the first surface area.

Figure 9:
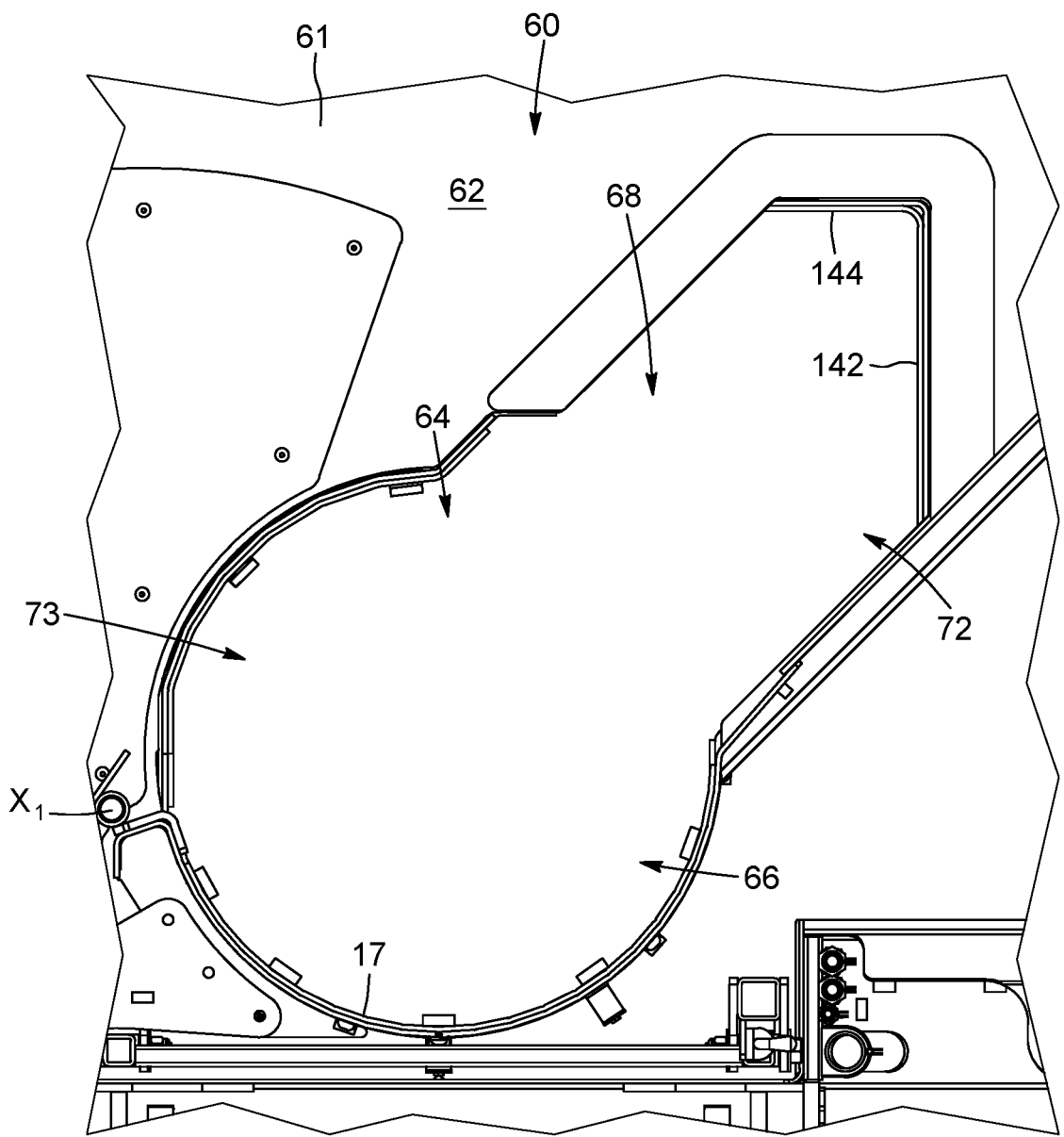
FIGS. 9 and 10 are side-elevation views of sections of the partition assembly of FIGS. 7 and 8 respectively, with the conveyor screw being omitted.

In some embodiments, the combined surface area of a main port 73 of the main passageway 66 and the by-pass port 72 of the by-pass passageway 68, when the choke 74 is configured in the open configuration, as represented for instance in FIG. 9, is comprised between about 1 000 square inches and about 4 000 square inches. In some other embodiments, the combined surface area of the main port 73 and the by-pass port 72, when the choke 74 is in the open configuration is comprised between about 1 500 square inches and about 2 500 square inches. In some other embodiments, the combined surface area of the main port 73 and the by-pass port 72, when the choke 74 is in the open configuration is comprised between about 1 700 square inches and about 2 200 square inches. In yet some other embodiments, the combined surface area of the main port 73 and the by-pass port 72, when the choke 74 is in the open configuration is about 1 900 square inches. In some embodiments, the surface area of the by-pass port 72 of the by-pass passageway 68 is substantially similar to the surface area of the main port 73 of the main passageway 66 when the choke 74 is configured in the open configuration. In some other embodiments, the surface area of the by-pass port 72 of the by-pass passageway 68 is smaller than the surface area of the main port 73 of the main passageway 66 when the choke 74 is configured in the open configuration. In some other embodiments, the surface area of the by-pass port 72 of the by-pass passageway 68 represents less than about 80% of the surface area of the main port 73 of the main passageway 66 when the choke 74 is configured in the open configuration. In some other embodiments, the surface area of the by-pass port 72 of the by-pass passageway 68 represents less than about 70% of the surface area of the main port 73 of the main passageway 66 when the choke 74 is configured in the open configuration. In yet some other embodiments, the surface area of the by-pass port 72 of the by-pass passageway 68 represents less than about 50% of the surface area of the main port 73 of the main passageway 66 when the choke 74 is configured in the open configuration.

Figure 10:
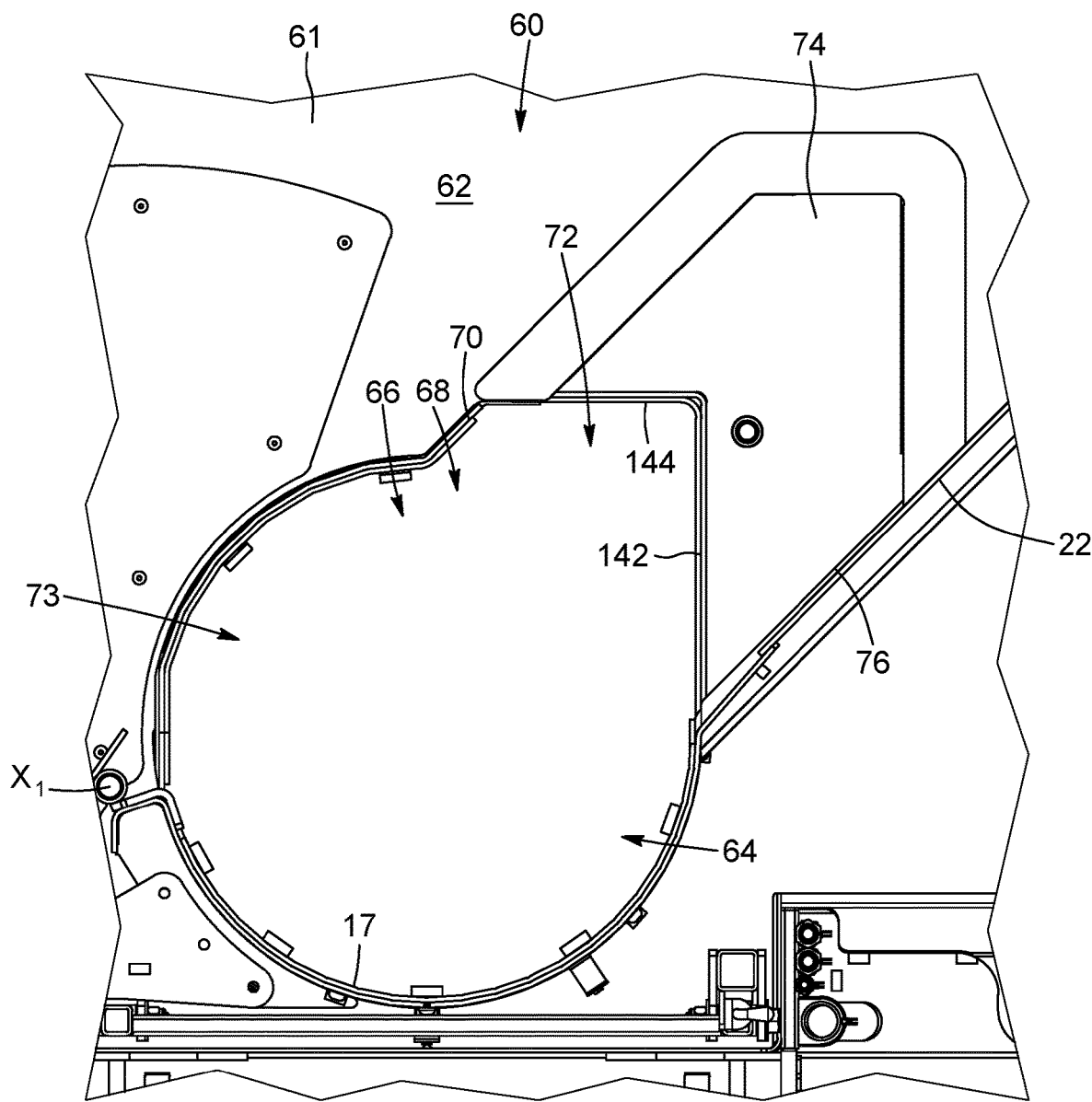

In some embodiments, the combined surface area of the main port 73 and the by-pass port 72, when the choke 74 is in the opening restricted configuration, as represented for instance in FIG. 10, is comprised between about 300 square inches and about 2 500 square inches. In some other embodiments, the combined surface area of the main port 73 and the by-pass port 72, when the choke 74 is in the opening restricted configuration is comprised between about 700 square inches and about 1 500 square inches. In some other embodiments, the combined surface area of the main port 73 and the by-pass port 72, when the choke 74 is in the opening restricted configuration is comprised between about 900 square inches and about 1 300 square inches. In yet some other embodiments, the combined surface area of the main port 73 and the by-pass port 72, when the choke is in the opening restricted configuration is about 1 200 square inches. In some embodiments, the surface area of the by-pass port 72 of the by-pass passageway 68 is smaller than the surface area of the main port 73 of the main passageway 66 when the choke 74 is configured in the opening restricted configuration. In some other embodiments, the surface area of the by-pass port 72 of the by-pass passageway 68 represents less than about 80% of the surface area of the main port 73 of the main passageway 66 when the choke 74 is configured in the opening restricted configuration. In some other embodiments, the surface area of the by-pass port 72 of the by-pass passageway 68 represents less than about 70% of the surface area of the main port 73 of the main passageway 66 when the choke 74 is configured in the opening restricted configuration. In some other embodiments, the surface area of the by-pass port 72 of the by-pass passageway 68 represents less than about 50% of the surface area of the main port 73 of the main passageway 66 when the choke 74 is configured in the opening restricted configuration. In some other embodiments, the surface area of the by-pass port 72 of the by-pass passageway 68 represents less than about 40% of the surface area of the main port 73 of the main passageway 66 when the choke 74 is configured in the opening restricted configuration. In yet some other embodiments, the surface area of the by-pass port 72 of the by-pass passageway 68 represents less than about 25% of the surface area of the main port 73 of the main passageway 66 when the choke 74 is configured in the opening restricted configuration.

In the shown embodiment, the choke 74 comprises a hopper-facing choke surface 120 and a container-facing choke surface 130. In the embodiment shown, the hopper-facing choke surface 120 is substantially planar and extends substantially vertically, i.e. the hopper-facing choke surface 120 extends substantially in a same plane as the hopper-facing surface 62 of the partition wall 61. In the embodiment shown, the container-facing choke surface 130 is substantially planar and extends substantially vertically. The container-facing choke surface 130 can extend substantially in a same plane as the container-facing surface 65 of the partition wall 61. In the embodiment shown, the hopper-facing choke surface 120 and the container-facing choke surface 130 of the choke 74 extend substantially parallel to each other and are spaced-apart from each other. Therefore, a choke inner volume is defined therebetween which is partially delimited by a port-delimiting peripheral edge 140 extending between the container-facing choke surface 130 and the hopper-facing choke surface 120 (transversally—substantially perpendicularly, in the embodiment shown—to the container-facing choke surface 130 and the hopper-facing choke surface 120). In other words, in the embodiment shown, the port-delimiting peripheral edge 140 extends substantially parallel to the longitudinal axis L of the conveyor screw 18. In the embodiment shown, a thickness of the choke 74 (considered between the hopper-facing choke surface 120 and the container-facing choke surface 130 and along the longitudinal axis L of the conveyor screw 18) substantially corresponds to the thickness t of the partition wall 61 and to a length of the main and by-pass passageways 66, 68.

In the embodiment shown, the port-delimiting peripheral edge 140 defines a recess. For instance and without being limitative, the port-delimiting peripheral edge 140 comprises first and second segments 142, 144 extending transversally (for instance substantially perpendicularly) to each other. In the embodiment shown, the first segment 142 extends substantially vertically and the second segment 144 extends substantially horizontally.

It is thus understood that the port-delimiting peripheral edge 140 is shaped and dimensioned so as not to hinder the conveying of materials by the screw 18. In other words, the port-delimiting peripheral edge 140 of the choke 74 is designed so that, when the choke 74 is in its lowest configuration—i.e. when the choke 74 is configured in the restricted opening configuration—the surface of the main passageway 68 formed in the hopper-facing surface 62 is not limited by the choke 74. Furthermore, in the embodiment shown, when the choke 74 is configured in the restricted opening configuration, a surface area of the by-pass port 72 is non-void and materials can be conveyed from the hopper chamber 13 to the container 14 therethrough.

The shape of the port-delimiting peripheral edge 140 is obviously not limited to the embodiment shown. For instance, it could be conceived a port-delimiting peripheral edge 140 with a concavity formed therein.

It is appreciated that the shape and the configuration of the choke 74 could vary from the embodiment shown, For instance, the choke 74 could be substantially planar and extends in a plane substantially vertical and substantially parallel to one of the hopper-facing surface 62 and the container-facing surface 65 of the partition wall 61. The choke 74 could be slidably mounted with respect to the hopper-facing surface 62 and the by-pass port 72 and could extend substantially in a same plane as one of the hopper-facing surface 62 and the container-facing surface 65 of the partition wall 61 or in-between.

Figure 11:
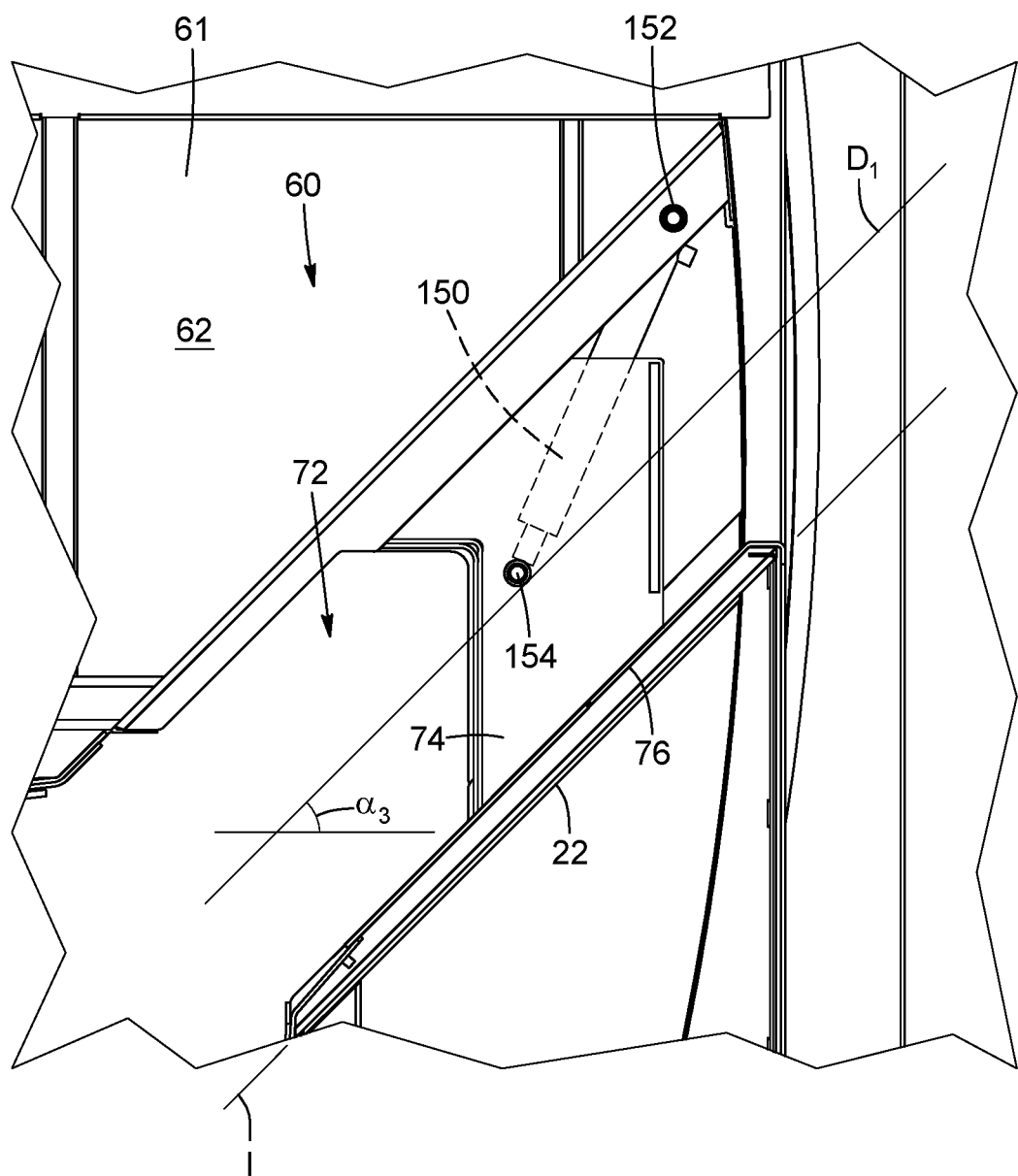
FIGS. 11 and 12 are enlarged side-elevation views of sections of the partition assembly of FIGS. 9 and 10, the partition assembly further comprising a choke actuator operatively connected to the choke.
Figure 12:
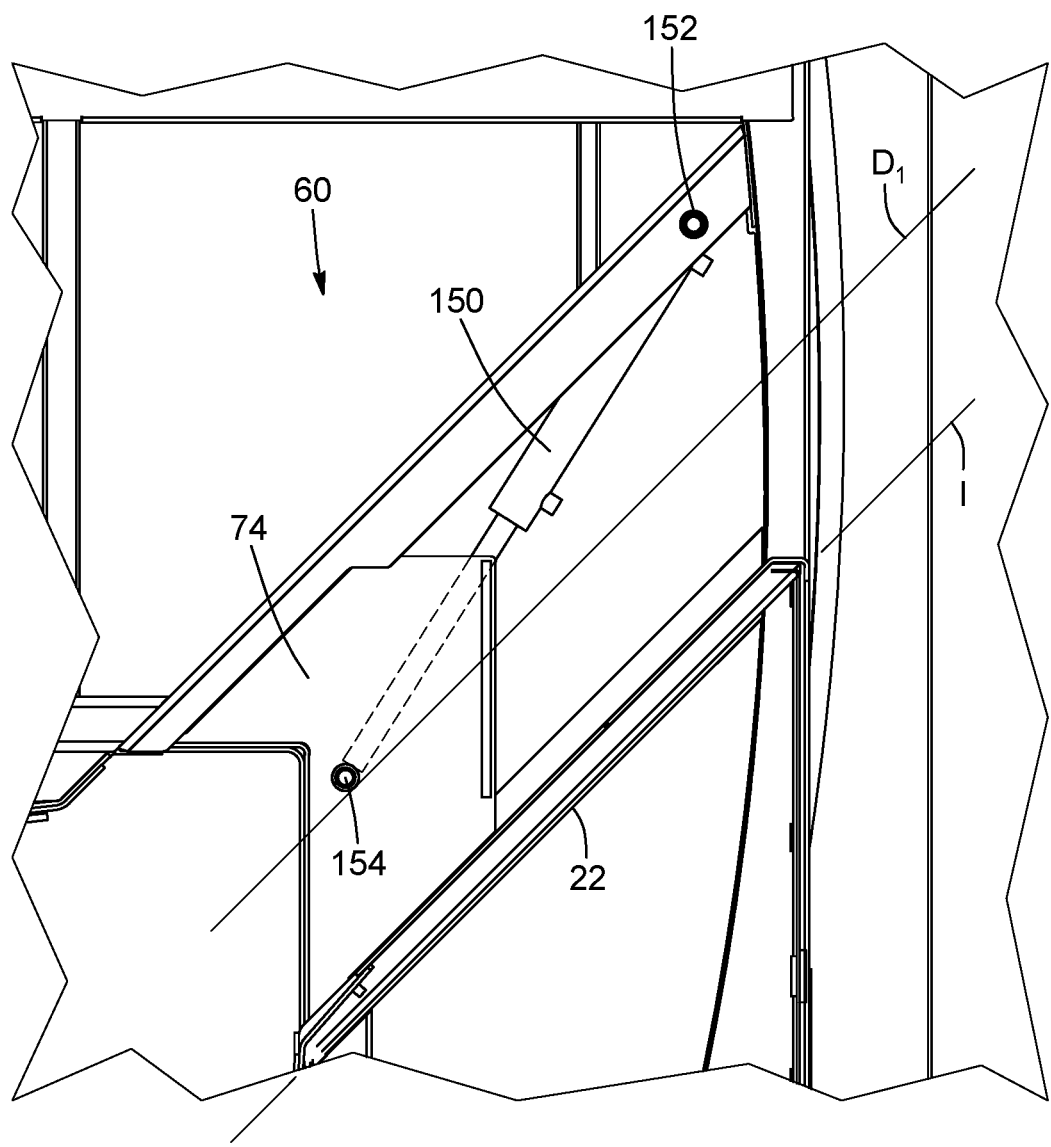
Figure 13:
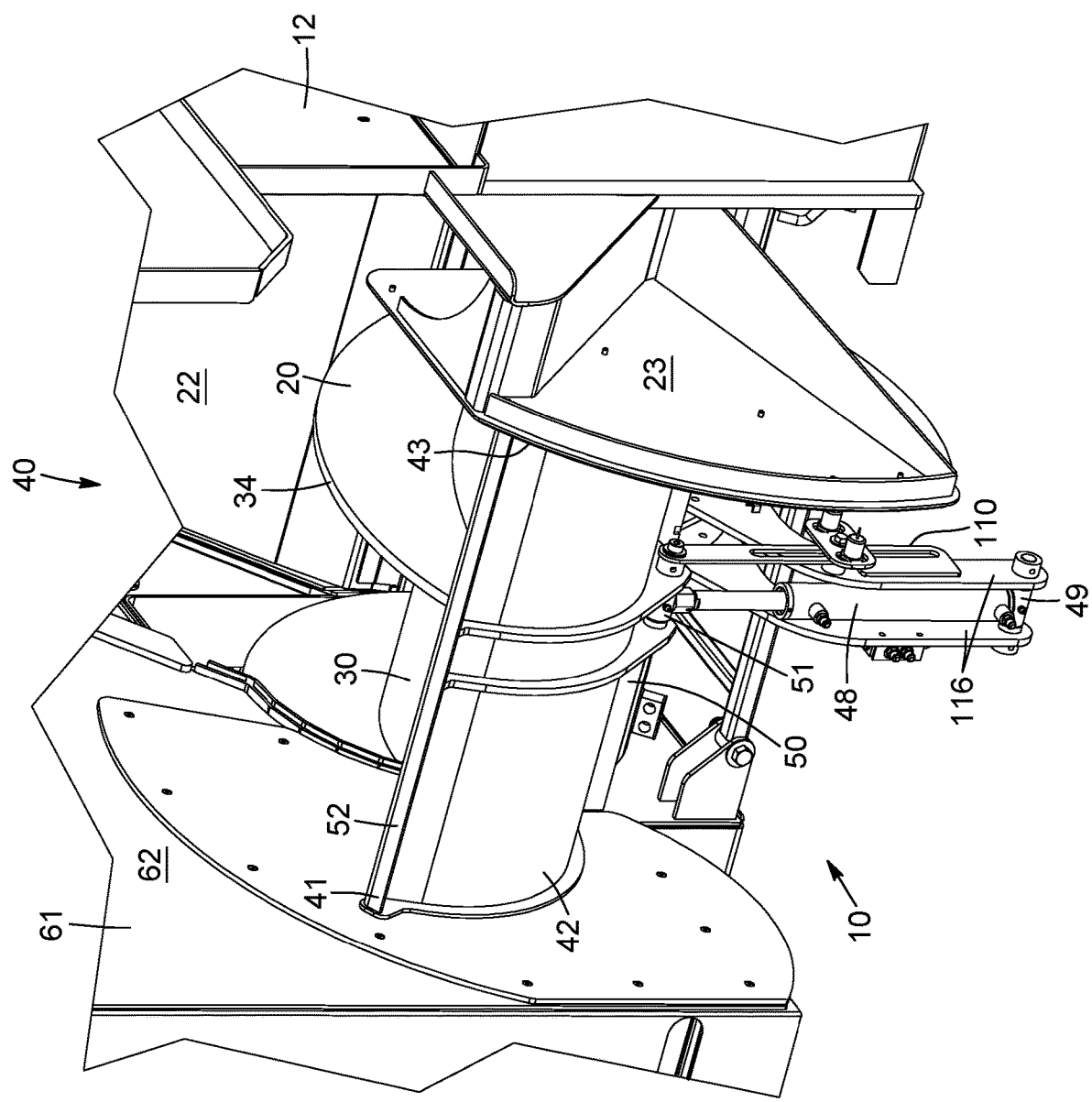
FIG. 13 is a top perspective view of a portion of the compaction apparatus of FIG. 2, the flap of the containment assembly being in an intermediate configuration between the containment configuration and the loading configuration.

In the embodiment shown, as represented in FIGS. 11 and 12, the partition assembly 60 further comprises a choke actuator 150 cooperating with the choke 74 to slide the choke 74 from one of the open configuration and the restricted opening configuration to the other. For instance, the choke actuator 150 comprises a hydraulic or pneumatic cylinder having a first end 152 secured to the partition wall 61 and a second end 154 mounted to the choke 74. In the embodiment shown, the first end 152 extends between the hopper-facing surface 62 and the container-facing surface 65 of the partition wall 61 and the choke actuator 150 at least partially extends between the hopper-facing choke surface 120 and the container-facing choke surface 130 of the choke 74 (i.e. in the embodiment shown, the choke actuator 150 is at least partially contained in the choke inner volume partially delimited by the hopper-facing choke surface 120, the container-facing choke surface 130 and the port-delimiting peripheral edge 140). In the embodiment shown, the second end 154 of the choke actuator 150 is pivotably mounted to the choke 74.

The choke actuator 150 is configured to translate the choke 74 along the partition wall 61 and along a choke displacement axis D1, as represented in FIGS. 11 and 12. In the embodiment shown, the choke displacement axis D1 forms an inclination angle α3 with a horizontal direction. In some embodiments, the inclination angle α3 is comprised between about 10 degrees and about 85 degrees. In some other embodiments, the inclination angle α3 is comprised between about 20 degrees and about 80 degrees. In some other embodiments, the inclination angle α3 is comprised between about 30 degrees and about 70 degrees. In yet some other embodiments, the inclination angle α3 is about 45 degrees.

The choke 74 further comprises a lower edge 76 having a section at least partially substantially conforming to a profile of the inclined bottom panel 22 of the hopper housing 12. It is thus understood that when the choke 74 is translated from one of the restricted opening configuration and the open configuration to the other, the lower edge 76 of the choke 74 slides along the inclined bottom panel 22 of the hopper housing 12. In other words, in the shown embodiment, the choke displacement axis D1 of the choke 74 is substantially parallel to the inclination direction I of the inclined bottom panel 22.

It is appreciated that the location, the actuation and the displacement of the choke 74 can vary from the embodiment shown. For instance, it could be conceived a partition assembly 60 including first and second guiding rails secured to one of the hopper-facing surface 62 and the container-facing surface 65 of the partition wall 61 and extending substantially parallel to each other. For instance, the first and second guiding rails could be substantially vertical and configured to cooperate with the choke 74, for the choke 74 to be translated along one of the container-facing surface 65 and the hopper-facing surface 62 (or in-between) along an axis substantially parallel to the plane of one of the hopper-facing surface 62 and the container-facing surface 65. A partition assembly 60 comprising any other arrangement—such as guiding rails extending along axes forming an angle of about 45 degrees with a vertical direction—could also be conceived.

More generally, it is appreciated that the shape, the configuration, and the location of the choke 74 can vary from the embodiment shown.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A compaction apparatus comprising:
    a hopper housing defining a hopper chamber to receive materials;
    a container to store the materials in a compacted fashion;
    a conveyor screw configured to convey the materials from the hopper chamber to the container and comprising a screw hopper segment extending in the hopper chamber; and
    a loading assembly comprising a flap mounted to the hopper housing and defining a material-receiving cavity, the flap being movable between:
        a loading configuration wherein the flap uncovers the screw hopper segment to allow the introduction of the materials in the material-receiving cavity of the flap, and
        an unloading configuration wherein the flap at least partially covers the screw hopper segment.

2. The compaction apparatus according to claim 1, wherein the flap comprises:
    a bottom wall with an inner surface; and
    first and second lateral wall portions extending transversally from the bottom wall;
    the material-receiving cavity being at least partially delimited by the inner surface of the bottom wall and the first and second lateral wall portions.

3. The compaction apparatus according to claim 1, wherein the flap comprises a bottom wall with an inner surface defining a concavity, the concavity forming at least partially the material-receiving cavity.

4. The compaction apparatus according to claim 3, wherein the inner surface of the bottom wall of the flap faces substantially upwardly in the loading configuration and faces substantially downwardly in the unloading configuration.

5. The compaction apparatus according to claim 3, wherein the screw hopper segment comprises:
    a screw shaft; and
    a helical screw blade extending around and mounted to the screw shaft and having a circumferential perimeter;
    wherein the concavity of the flap substantially conforms to a portion of the circumferential perimeter of the helical screw blade.

6. The compaction apparatus according to claim 5, wherein the circumferential perimeter of the helical screw blade comprises an upper portion and a lower portion and wherein the hopper housing comprises a lower portion forming a hopper trough having an inner surface, the concavity of the flap substantially conforming to the upper portion of the circumferential perimeter, whereas the inner surface of the hopper trough substantially conforms to the lower portion of the circumferential perimeter.

7. The compaction apparatus according to claim 1, wherein the screw hopper segment has a longitudinal axis and the flap is pivotably mounted to the hopper housing and pivotable about a flap pivoting axis extending substantially parallel to the longitudinal axis of the screw hopper segment.

8. The compaction apparatus according to claim 7, wherein the hopper housing comprises a lower portion forming a hopper trough, the flap being pivotably mounted adjacent to an upper edge of the hopper trough.

9. The compaction apparatus according to claim 1, wherein the loading assembly further comprises a flap actuator cooperating with the flap to move the flap from one of the loading configuration and the unloading configuration to the other, the flap actuator comprising:

a first end mounted to the hopper housing, and
a second end mounted to the flap.

10. The compaction apparatus according to claim 1, wherein the conveyor screw has a circumferential perimeter, the compaction apparatus further comprising a partition assembly located between the hopper chamber and the container and including:
a partition wall delimiting at least partially the hopper chamber and having a hopper-facing surface;
a through opening defined in the partition wall and allowing passage of the materials conveyed by the conveyor screw through the partition wall, the through opening providing access to a main passageway having a perimeter shaped to be in close relation to a portion of the circumferential perimeter of the conveyor screw;
wherein the flap comprises a bottom wall with an inner surface substantially conforming to a section of the perimeter of the main passageway.

11. The compaction apparatus according to claim 10, wherein the inner surface of the bottom wall of the flap is substantially in register with the section of the perimeter of the main passageway when configured in the unloading configuration.

12. A compaction apparatus comprising:
a hopper housing defining a hopper chamber to receive materials;
a container to store the materials in a compacted fashion;
a conveyor screw configured to convey the materials from the hopper chamber to the container and comprising a screw hopper segment extending in the hopper chamber and having a longitudinal axis; and
a containment assembly comprising a flap mounted to the hopper housing and being movable between:
a loading configuration wherein the flap uncovers the screw hopper segment to allow the introduction of the materials in the hopper chamber, and
a containment configuration wherein the flap at least partially covers the screw hopper segment to contain the materials in the hopper chamber.

13. The compaction apparatus according to claim 12, wherein the flap is pivotably mounted to the hopper housing.

14. The compaction apparatus according to claim 12, wherein the containment assembly further comprises a flap actuator cooperating with the flap to move the flap from one of the loading configuration and the containment configuration to the other, the flap actuator comprising:
a first end mounted to the hopper housing, and
a second end mounted to the flap.

15. The compaction apparatus according to claim 12, wherein the flap comprises a bottom wall with an inner surface and the conveyor screw has a circumferential perimeter, the compaction apparatus further comprising a partition assembly located between the hopper chamber and the container and including:
a partition wall delimiting at least partially the hopper chamber and having a hopper-facing surface;
a through opening defined in the partition wall and allowing passage of the materials conveyed by the conveyor screw through the partition wall, the through opening providing access to a main passageway shaped to be in close relation to a portion of the circumferential perimeter of the conveyor screw;
the inner surface of the bottom wall of the flap substantially conforming to a section of the perimeter of the main passageway.

16. The compaction apparatus according to claim 15, wherein the inner surface of the bottom wall of the flap is substantially in register with the section of the perimeter of the main passageway when configured in the containment configuration.

17. The compaction apparatus according to claim 15, wherein the hopper housing further comprises a distal wall extending substantially parallel to the partition wall and delimiting in between a length of the hopper chamber, wherein a length of the flap substantially corresponds to the length of the hopper chamber.

18. The compaction apparatus according to claim 12, the flap comprising a bottom wall with an inner surface delimitating at least partially a material-receiving cavity, wherein:
when configured in the loading configuration, the inner surface of the bottom wall of the flap faces substantially upwardly; and
when configured in the containment configuration, the inner surface of the bottom wall of the flap faces substantially downwardly.

19. A compaction apparatus comprising:
a hopper housing defining a hopper chamber to receive materials;
a container to store the materials in a compacted fashion;
a conveyor screw configured to convey the materials from the hopper chamber to the container and comprising a circumferential perimeter and a screw hopper segment extending in the hopper chamber; and
a partition assembly located between the hopper chamber and the container and having:
a partition wall delimiting at least partially the hopper chamber and having a hopper-facing surface;
a through opening defined in the partition wall and allowing passage of the materials conveyed by the conveyor screw through the partition wall, the through opening providing access to:
a main passageway shaped to be in close relation to a portion of the circumferential perimeter of the conveyor screw; and
a by-pass passageway extending outwardly beyond the circumferential perimeter of the conveyor screw and offset from the main passageway and defining a by-pass port in the hopper-facing surface; and
a choke slidably mounted to the partition wall to vary a surface area of the by-pass port.

20. The compaction apparatus according to claim 19, wherein the choke is displaceable between at least:
an open configuration wherein the by-pass port has a first surface area, and
a restricted opening configuration wherein the by-pass port has a second surface area smaller than the first surface area.

21. The compaction apparatus according to claim 19, wherein the choke is translatable along the partition wall and along a choke displacement axis.

22. The compaction apparatus according to claim 21, wherein the choke displacement axis is inclined with regards to a horizontal direction.

23. The compaction apparatus according to claim 20, wherein the partition assembly further comprises a choke actuator cooperating with the choke to slide the choke from one of the open configuration and the restricted opening configuration to the other, the choke comprising a hopper-facing choke surface and a container-facing choke surface spaced apart from each other, the choke actuator extending at least partially between the hopper-facing choke surface and the container-facing choke surface.

24. The compaction apparatus according to claim 19, wherein the hopper housing comprises an inclined bottom panel and the choke comprises a lower edge having a section substantially conforming to a profile of the inclined bottom panel, the inclined bottom panel defining an inclination direction, the choke being slidable along the partition wall and along a choke displacement axis extending substantially parallel to the inclination direction.

25. The compaction apparatus according to claim 19, wherein the partition wall further comprises a container-facing surface spaced apart from the hopper-facing surface, the choke being at least partially mounted between the container-facing surface and the hopper-facing surface of the partition wall.

26. A vehicle comprising:
   a chassis; and
   a compaction apparatus according to claim 1 mounted to the chassis.

\* \* \* \* \*